US012624312B2

(12) United States Patent
Fernandez-Prieto et al.

(10) Patent No.: US 12,624,312 B2
(45) Date of Patent: May 12, 2026

(54) FABRIC CARE COMPOSITION WITH DELIVERY PARTICLES

(71) Applicant: The Procter & Gamble Company, Cincinnati, OH (US)

(72) Inventors: Susana Fernandez-Prieto, Benicarlo (ES); Cedric Marc Tahon, Ghent (BE); Johan Smets, Lubbeek (BE); Linsheng Feng, Menasha, WI (US)

(73) Assignee: The Procter & Gamble Company, Cincinnati, OH (US)

( * ) Notice: Subject to any disclaimer, the term of this patent is extended or adjusted under 35 U.S.C. 154(b) by 684 days.

(21) Appl. No.: 17/885,603

(22) Filed: Aug. 11, 2022

(65) Prior Publication Data

US 2023/0062702 A1 Mar. 2, 2023

Related U.S. Application Data

(60) Provisional application No. 63/231,771, filed on Aug. 11, 2021.

(51) Int. Cl.

| | |
|---|---|
| ***C11D 1/62*** | (2006.01) |
| ***C11D 3/00*** | (2006.01) |
| ***C11D 3/22*** | (2006.01) |
| ***C11D 3/30*** | (2006.01) |
| ***C11D 3/37*** | (2006.01) |
| ***C11D 3/50*** | (2006.01) |

(52) U.S. Cl.
CPC .............. *C11D 3/0015* (2013.01); *C11D 3/30* (2013.01); *C11D 3/505* (2013.01)

(58) Field of Classification Search
CPC ......... C11D 3/0015; C11D 3/30; C11D 3/505; C11D 1/62; C11D 1/662; C11D 3/22; C11D 3/222; C11D 3/37; C11D 3/3769; C11D 3/502
See application file for complete search history.

(56) References Cited

U.S. PATENT DOCUMENTS

| | | | |
|---|---|---|---|
| 4,138,362 | A | 2/1979 | Vassiliades et al. |
| 5,489,401 | A | 2/1996 | Freeman |
| 6,159,918 | A | 12/2000 | Bae-lee et al. |
| 6,630,437 | B1 | 10/2003 | Murphy et al. |
| 6,632,783 | B1 | 10/2003 | Giblin et al. |
| 6,797,670 | B2 | 9/2004 | Kleban et al. |
| 8,546,509 | B2 | 10/2013 | Kulke et al. |
| 9,512,388 | B2 | 12/2016 | Meier et al. |
| 9,816,059 | B2 | 11/2017 | De Villeneuve et al. |
| 10,085,925 | B2 | 10/2018 | Lei et al. |
| 10,398,632 | B2 | 9/2019 | Aussant et al. |
| 12,013,402 | B2 | 6/2024 | Quach |
| 2005/0047990 | A1 | 3/2005 | Rees et al. |
| 2005/0047991 | A1 | 3/2005 | Rees et al. |
| 2008/0118568 | A1 | 5/2008 | Smets et al. |
| 2011/0071064 | A1 | 3/2011 | Lei et al. |
| 2013/0330292 | A1 | 12/2013 | Lei et al. |
| 2015/0252312 | A1 | 9/2015 | De Villeneuve |
| 2016/0158121 | A1 | 6/2016 | Lei et al. |
| 2017/0121649 | A1 | 5/2017 | Shi et al. |
| 2018/0015009 | A1 | 1/2018 | Soubiran et al. |
| 2019/0010423 | A1 * | 1/2019 | Saveyn ................ C11D 17/041 |
| 2019/0062676 | A1 | 2/2019 | Ott |
| 2019/0184364 | A1 | 6/2019 | Brahms et al. |
| 2020/0360243 | A1 * | 11/2020 | Bulgarelli ................ A61K 8/84 |
| 2020/0406218 | A1 * | 12/2020 | Berthier ............. C08G 18/7642 |
| 2021/0237021 | A1 | 8/2021 | Akeroyd et al. |
| 2021/0252469 | A1 | 8/2021 | Feng |
| 2022/0071863 | A1 | 3/2022 | Xu et al. |
| 2022/0071865 | A1 | 3/2022 | Sasaki et al. |
| 2022/0125700 | A1 | 4/2022 | Lei et al. |
| 2023/0002706 | A1 | 1/2023 | Yeom et al. |

FOREIGN PATENT DOCUMENTS

| | | | |
|---|---|---|---|
| EP | 0913462 | A1 | 5/1999 |
| JP | 2004060078 | A | 2/2004 |
| JP | 2007031900 | A | 2/2007 |
| JP | 2016084556 | A | 5/2016 |
| KR | 100523479 | B1 | 10/2005 |
| WO | 9923196 | A1 | 5/1999 |
| WO | 03022972 | A1 | 3/2003 |
| WO | 2011154893 | A1 | 12/2011 |
| WO | 2012044263 | A2 | 4/2012 |
| WO | 2015023961 | A1 | 2/2015 |
| WO | 2016071149 | A1 | 5/2016 |
| WO | 2017218880 | A1 | 12/2017 |
| WO | 2018053356 | A1 | 3/2018 |

(Continued)

OTHER PUBLICATIONS

PCT Search Report and Written Opinion for PCT/US2022/039888 dated Oct. 24, 2022, 12 pages.
All Office Actions; U.S. Appl. No. 17/885,616, filed Aug. 11, 2022.
Keeper Of The Home: "Benefits of Line Drying—Keeper of the Home", Retrieved from the Internet: https://keeperofthehome.org/benefits-of-line-drying/, Jun. 26, 2013, pp. 1-5.
Mishra S et al: "Ester Quats: The Novel Class of Cationic Fabric Softeners", Journal Of Oleo Science, vol. 56, No. 6, Feb. 13, 2007, pp. 269-276.
Unpublished U.S. Appl. No. 17/885,616, filed Aug. 11, 2022 to Susana Fernandez-Prieto et al.

(Continued)

*Primary Examiner* — Brian P Mruk
(74) *Attorney, Agent, or Firm* — Carolyn S. Powell

(57) ABSTRACT

A fabric care composition that includes quaternary ammonium ester material and a population of delivery particles, where the quaternary ammonium ester material includes triester quaternary ammonium material ("triester quats"), and where the shells of the delivery particles include a polymeric material that is the reaction product of a polyisocyanate and chitosan, preferably hydrolyzed chitosan. A method of treating a fabric with the composition.

18 Claims, No Drawings

(56) References Cited

FOREIGN PATENT DOCUMENTS

| | | | |
|---|---|---|---|
| WO | 2018183150 | A1 | 10/2018 |
| WO | 2019063515 | A1 | 4/2019 |
| WO | 2019171929 | A1 | 9/2019 |
| WO | 2019171959 | A1 | 9/2019 |
| WO | 2019179939 | A1 | 9/2019 |
| WO | 2019181668 | A1 | 9/2019 |
| WO | 2019181682 | A1 | 9/2019 |
| WO | 2019185553 | A1 | 10/2019 |
| WO | 2019210125 | A1 | 10/2019 |
| WO | 2020058044 | A1 | 3/2020 |
| WO | 2020131890 | A1 | 6/2020 |
| WO | 2020194910 | A1 | 10/2020 |
| WO | 2020195132 | A1 | 10/2020 |
| WO | 2020209907 | A1 | 10/2020 |
| WO | 2020209908 | A1 | 10/2020 |
| WO | 2020209909 | A1 | 10/2020 |
| WO | 2020264566 | A1 | 12/2020 |
| WO | 2021116306 | A1 | 6/2021 |
| WO | 2021163599 | A1 | 8/2021 |

OTHER PUBLICATIONS

Gincy Marina Mathew et al. “Chitosan Derivatives: Properties and Applications” vol. 7, No Known Date, pp. 135-161.

Gregorio Crini et al, “Sustainable Agriculture Reviews 35” vol. 35, 2019, pp. 338.

Jose Alexandre Borges Valle et al. “Chitosan microcapsules: Methods of the production and use in the textile finishing” vol. 138, 2021, pp. 29.

Kathleen McDonough et al. “Assessing the biodegradability of microparticles disposed down the drain”, vol. 175, Feb. 20, 2017, pp. 452-458.

Lowell H. Hall et al. “The Electrotopological State: An Atom Index for QSAR” vol. 10, 1991, pp. 43-51.

Manuel Jose Lis Arias et al. “Influence of Chitosan Characteristics in the Microencapsulation of Essential Oils” vol. 14, 2021, pp. 119-129.

Shih-Chang Hsu et al. “Free radical degradation of chitosan with potassium persulfate” vol. 75, 2002, pp. 73-83.

* cited by examiner

FABRIC CARE COMPOSITION WITH DELIVERY PARTICLES

This application claims benefit to Provisional Ser. No. 63/231,771, filed on Aug. 11, 2021.

FIELD OF THE INVENTION

The present disclosure relates to a fabric care composition that includes quaternary ammonium ester material and a population of delivery particles, where the quaternary ammonium ester material includes triester quaternary ammonium material ("triester quats"), and where the shells of the delivery particles include a polymeric material that is the reaction product of a polyisocyanate and chitosan, preferably hydrolyzed chitosan. The present disclosure also relates to a method of treating a fabric with the composition.

BACKGROUND OF THE INVENTION

Manufacturers of fabric care compositions often formulated with delivery particles, as such particles offer advantages for delivering benefit agents, such as long-term release profiles, or release at certain desirable touchpoints.

Delivery particles made, at least in part, from naturally occurring materials are desirable for environmental reasons. Particles that are capable of biodegrading within certain periods of time are also desirable for similar reasons.

Additionally, cationically charged particles may also be advantageous, as they tend to show improved deposition on negatively charged surfaces, which can include many types of fabrics such as cotton. Cationic charge can be provided by the addition of surface coatings, but such materials may need to be added at some point of the manufacturing process, thereby resulting in additional processing and cost. Therefore, there is an advantage to using materials that are naturally cationically under normal manufacturing, storage, and/or usage conditions.

Deposition may also be improved via the use of deposition aids in a product formulation, but again, this brings extra steps, formulation space, and cost. It would be desirable to formulate a product that provides improved delivery particle deposition by using materials that can provide other benefits in the end-use of the product, thereby reducing complexity and/or cost. Deposition aids and/or coating may still be employed, but presumably they could be used at lower levels. Alternatively, they could be used in combination with the other materials to improve deposition and/or subsequent performance even more.

There is a need for fabric care compositions that include combinations of ingredients, including delivery particles that preferably use natural materials and/or that biodegrade, that lead to improved benefit agent performance, such as the perception of increased perfume intensity.

SUMMARY OF THE INVENTION

The present disclosure relates to a fabric care composition that includes particular esterquats and particular delivery particles.

For example, the present disclosure relates to a fabric care composition that includes: quaternary ammonium ester material, wherein the quaternary ammonium ester material includes triester quaternary ammonium material ("triester quats"), wherein the triester quaternary ammonium material is derived, in part, from C13-C22 fatty acids; and a population of delivery particles, where the delivery particles include a core and shell surrounding the core, where the core includes a benefit agent, where the shell comprises a polymeric material that is the reaction product of a polyisocyanate and chitosan, preferably hydrolyzed chitosan.

A method of treating a fabric, wherein the method includes the step of contacting the fabric with a fabric care composition according to the present disclosure, optionally in the presence of water.

DETAILED DESCRIPTION OF THE INVENTION

The present disclosure relates to fabric care compositions that include certain quaternary ammonium ester material and certain delivery particles. For example, the quaternary ammonium ester material comprises triester quat material that is useful as a fabric conditioning/softening agent. The delivery particles are core/shell particles that include a benefit agent in the core, preferably fragrance, and a shell that includes a reaction product of chitosan and isocyanates.

It is believed that the combination of the triester quat material and the chitosan/isocyanate delivery particles provides surprisingly good performance, particularly at the wet touchpoint. Additionally, such delivery particles may be preferred because the shells are at least partially derived from naturally-sourced material (chitosan). Furthermore, it is believed that selecting chitosan with certain characteristics, such as relatively low molecular weight, relatively high degrees of deacetylization, or both, can provide processing, performance, and/or biodegradeability benefits in the compositions of the present disclosure. These chitosan characteristics may be obtainable by using hydrolyzed chitosan, which may result from the chitosan being hydrolyzed under certain conditions.

The materials, compositions, and related processes are discussed in more detail below.

As used herein, the articles "a" and "an" when used in a claim, are understood to mean one or more of what is claimed or described. As used herein, the terms "include," "includes," and "including" are meant to be non-limiting. The compositions of the present disclosure can comprise, consist essentially of, or consist of, the components of the present disclosure.

The terms "substantially free of" or "substantially free from" may be used herein. This means that the indicated material is at the very minimum not deliberately added to the composition to form part of it, or, preferably, is not present at analytically detectable levels. It is meant to include compositions whereby the indicated material is present only as an impurity in one of the other materials deliberately included. The indicated material may be present, if at all, at a level of less than 1%, or less than 0.1%, or less than 0.01%, or even 0%, by weight of the composition.

As used herein the phrase "fabric care composition" includes compositions and formulations designed for treating fabric. Such compositions include but are not limited to, laundry cleaning compositions and detergents, fabric softening compositions, fabric enhancing compositions, fabric freshening compositions, laundry prewash, laundry pretreat, laundry additives, spray products, dry cleaning agent or composition, laundry rinse additive, wash additive, post-rinse fabric treatment, ironing aid, unit dose formulation, delayed delivery formulation, detergent contained on or in a porous substrate or nonwoven sheet, and other suitable forms that may be apparent to one skilled in the art in view of the teachings herein. Such compositions may be used as a pre-laundering treatment, a post-laundering treatment, or may be added during the rinse or wash cycle of the laundering operation.

As used herein, "delivery particles," "particles," "encapsulates," "microcapsules," and "capsules" are used interchangeably, unless indicated otherwise. As used herein, these terms typically refer to core/shell delivery particles.

Unless otherwise noted, all component or composition levels are in reference to the active portion of that component or composition, and are exclusive of impurities, for example, residual solvents or by-products, which may be present in commercially available sources of such components or compositions.

All temperatures herein are in degrees Celsius (° C.) unless otherwise indicated. Unless otherwise specified, all measurements herein are conducted at 20° C. and under the atmospheric pressure.

In all embodiments of the present disclosure, all percentages are by weight of the total composition, unless specifically stated otherwise. All ratios are weight ratios, unless specifically stated otherwise.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Fabric Care Composition

The present disclosure relates to fabric care compositions. As described in more detail below, the fabric care compositions may comprise quaternary ammonium ester material, wherein the quaternary ammonium ester material comprises triester quaternary ammonium material ("triester quats"), wherein the triester quaternary ammonium material is derived, in part, from C13-C22 fatty acids. The fabric care compositions further comprise a population of delivery particles, where the particles comprise a core and a shell surrounding the core; the core comprises a benefit agent and optionally a partitioning modifier, and the shell comprises a polymeric material that is the reaction product of chitosan (preferably hydrolyzed chitosan) and isocyanates, which may be referred to as a polyurea/chitosan shell.

The fabric care composition may be a fabric conditioning composition (including a liquid fabric softening and/or enhancing composition), a laundry additive, a fabric refresher composition (including a spray), or a mixture thereof. Preferably the fabric care composition is a rinse-added fabric care composition, suitable for use in the rinse cycle of an automatic washing machine.

The fabric care composition may be in the form of a liquid composition, a granular composition, a hydrocolloid, a single-compartment pouch, a multi-compartment pouch, a dissolvable sheet, a pastille or bead, a fibrous article, a tablet, a stick, a bar, a flake, a foam/mousse, a non-woven sheet, or a mixture thereof.

The composition may be in the form of a liquid. The liquid composition may preferably include from about 50% to about 97%, preferably from about 60% to about 96%, more preferably from about 70% to about 95%, or even from about 80% to about 95%, by weight of the fabric treatment composition, of water. The liquid composition may be a liquid fabric conditioner. The liquid may be packaged in a pourable bottle. The liquid may be packaged in an aerosol can or other spray bottle.

The composition may be in the form of a solid. The composition may be in the form of a bead or pastille, which may be pastilled from a liquid melt. The composition may be an extruded product.

The composition may be in the form of a spray and may be dispensed, for example, from a bottle via a trigger sprayer and/or an aerosol container with a valve.

The composition may have a viscosity of from 1 to 1500 centipoises (1-1500 mPa*s), from 100 to 1000 centipoises (100-1000 mPa*s), or from 200 to 500 centipoises (200-500 mPa*s) at 20 $s^{-1}$ and 21° C.

The fabric care compositions of the present disclosure may be characterized by a pH of from about 2 to about 12, or from about 2 to about 8.5, or from about 2 to about 7, or from about 2 to about 5. The compositions of the present disclosure may have a pH of from about 2 to about 4, preferably a pH of from about 2 to about 3.7, more preferably a pH from about 2 to about 3.5, preferably in the form of an aqueous liquid. It is believed that such pH levels facilitate stability of the quaternary ammonium ester compound. The pH of a composition is determined by dissolving/dispersing the composition in deionized water to form a solution at 10% concentration, at about 20° C.

Additional components and/or features of the compositions are discussed in more detail below.

Ester Quat Material

The fabric care compositions of the present disclosure comprise quaternary ammonium ester material, which may act as a fabric conditioning active ("FCA"). Fabric conditioning actives may provide softness, anti-wrinkle, anti-static, conditioning, anti-stretch, color, and/or appearance benefits. The type and amount of quaternary ammonium ester compound may be selected for the target benefit to be delivered and/or the fabrics targeted for treatment.

The quaternary ammonium ester material (sometimes referred to as an "ester quat" material) may be present at a level of from about 1% to about 35%, by weight of the composition. The ester quat material may be preferably be present at a level of from about 2% to about 25%, more preferably from about 4% to about 20%, more preferably from about 5% to about 15%, more preferably from about 6% to about 12%, by weight to of the fabric care composition.

The level of quaternary ammonium ester material may depend on the desired concentration of total fabric conditioning active in the composition (diluted or concentrated composition) and of the presence (or not) of other FCAs. However, the risk on increasing viscosities over time is typically higher in fabric treatment compositions with higher FCA levels. On the other hand, at very high FCA levels, the viscosity may no longer be sufficiently controlled which renders the product unfit for use.

Quaternary ammonium ester materials may be derived from fatty acids (sometimes called parent fatty acids). The fatty acids may include saturated fatty acids and/or unsaturated fatty acids. The fatty acids may be characterized by an iodine value (see Methods). Preferably, the iodine value of the fatty acid from which the quaternary ammonium fabric compound is formed is from 0 to 140, or from 0 to about 90, or from about 10 to about 70, or from about 15 to about 50, or from about 18 to about 30. The iodine value may be from about 25 to 50, preferably from 30 to 48, more preferably from 32 to 45. Without being bound by theory, lower melting points resulting in easier processability of the FCA are obtained when the fatty acid from which the quaternary ammonium compound is formed is at least partially unsaturated. In particular, it is believed that double unsaturated fatty acids enable easy-to-process FCAs.

The fatty acids may include an alkyl portion containing, on average by weight, from about 13 to about 22 carbon atoms, or from about 14 to about 20 carbon atoms, preferably from about 16 to about 18 carbon atoms.

Suitable fatty acids may include those derived from (1) an animal fat, and/or a partially hydrogenated animal fat, such as beef tallow, lard, etc.; (2) a vegetable oil, and/or a partially hydrogenated vegetable oil such as canola oil, safflower oil, peanut oil, sunflower oil, sesame seed oil, rapeseed oil, cottonseed oil, corn oil, soybean oil, tall oil, rice bran oil, palm oil, palm kernel oil, coconut oil, other tropical palm oils, linseed oil, tung oil, etc.; (3) processed and/or bodied oils, such as linseed oil or tung oil via thermal, pressure, alkali-isomerization and catalytic treatments; (4) a mixture thereof, to yield saturated (e.g. stearic acid), unsaturated (e.g. oleic acid), polyunsaturated (linoleic acid), branched (e.g. isostearic acid) or cyclic (e.g. saturated or unsaturated $\alpha$-disubstituted cyclopentyl or cyclohexyl derivatives of polyunsaturated acids) fatty acids. Preferably, the fatty acids are derived from plants, preferably canola oil, safflower oil, peanut oil, sunflower oil, sesame seed oil, rapeseed oil, cottonseed oil, corn oil, soybean oil, tall oil, rice bran oil, palm oil, palm kernel oil, coconut oil, other tropical palm oils, linseed oil, tung oil, or mixtures thereof, more preferably canola oil, rapeseed oil, cottonseed oil, palm oil, palm kernel oil, coconut oil, or mixtures thereof.

The quaternary ammonium ester material may comprise compounds formed from fatty acids that are unsaturated. The fatty acids may comprise unsaturated C18 chains, which may be include a single double bond ("C18:1") or may be double unsaturated ("C18:2").

The quaternary ammonium ester material may be derived from fatty acids and optionally from triethanolamine, preferably unsaturated fatty acids that include eighteen carbons ("C18 fatty acids"), more preferably C18 fatty acids that include a single double bond ("C18:1 fatty acids"). The quaternary ammonium ester material may comprise from about 10% to about 40%, or from about 10% to about 30%, or from about 15% to about 30%, by weight of the quaternary ammonium ester material, of compounds derived from triethanolamine and C18:1 fatty acids. Such levels of fatty acids may facilitate handling of the resulting ester quat material.

The fatty acid from which the quaternary ammonium conditioning actives is formed may comprise from 1.0% to 20.0%, preferably from 1.5% to 18.0%, or from 3.0% to 15.0%, more preferably from 4.0% to 15.0% of double unsaturated C18 chains ("C18:2") by weight of total fatty acid chains. From about 2% to about 10%, or from about 2% to about 8%, or from about 2% to about 6%, by weight of the total fatty acids used to form the quaternary ammonium ester materials, may be C18:2 fatty acids.

On the other hand, very high levels of unsaturated fatty acid chains are to be avoided to minimize malodour formation as a result of oxidation of the fabric softener composition over time.

Suitable quaternary ammonium ester materials may include materials selected from the group consisting of monoester quaternary material ("monoester quats"), diester quaternary material ("diester quats"), triester quaternary material ("trimester quats"), and mixtures thereof. The level of monoester quat may be from 2.0% to 40.0%, the level of diester quat may be from 40.0% to 98.0%, and the level of triester quat may be from 0.1% to 30.0%, by weight of total quaternary ammonium ester material. The level of monoester quat may be from 2.0% to 40.0%, the level of diester quat may be from 40.0% to 98.0%, and the level of triester quat may be less than 5.0%, or less than 1.0%, or even 0.0%, by weight of total quaternary ammonium ester material. The level of monoester quat may be from 15.0% to 35.0%, the level of diester quat may be from 40.0% to 60.0%, and the level of triester quat may be from 15% to 38.0%, by weight of total quaternary ammonium ester material.

The quaternary ammonium ester material comprises triester quaternary ammonium material ("triester quats"). The triester quat material is derived, in part, from C13-C22 fatty acids.

Suitable quaternary ammonium ester materials may be derived from alkanolamines, for example, C1-C4 alkanolamines, preferably C2 alkanolamines (e.g., ethanolamines). The quaternary ammonium ester materials may be derived from monoalkanolamines, dialkanolamines, trialkanolamines, or mixtures thereof, preferably monoethanolamines, diethanolamines, di-isopropanolamines, triethanolamines, or mixtures thereof. The quaternary ammonium ester materials may be derived at least in part from trialkanolamines, preferably triethanolamines, which can lead to the formation of triester quat material.

The quaternary ammonium ester material may comprise a quaternized nitrogen atom that is substituted, at least in part. The quaternized nitrogen atom may be substituted, at least in part, with one or more C1-C3 alkyl or C1-C3 hydroxyl alkyl groups. The quaternized nitrogen atom may be substituted, at least in part, with a moiety selected from the group consisting of methyl, ethyl, propyl, hydroxyethyl, 2-hydroxypropyl, 1-methyl-2-hydroxyethyl, poly($C_2$-$C_3$ alkoxy), polyethoxy, benzyl, more preferably methyl or hydroxyethyl.

The quaternary ammonium ester material may comprise compounds according to Formula (I):

$$\{R^2_{(4-m)}—N+—[X—Y—R^1]_m\}A^- \quad \text{Formula (I)}$$

wherein: m is 1, 2 or 3, with provisos that in a given molecule, the value of each m is identical, and for at least some of the compounds according to Formula (I), m is 3; each $R^1$ comprises from 13 to 22 carbon atoms and is independently a linear hydrocarbyl or branched hydrocarbyl group, preferably $R^1$ is linear, more preferably $R^1$ is partially unsaturated linear alkyl chain; each $R^2$ is independently a $C_1$-$C_3$ alkyl or hydroxyalkyl group and/or each $R^2$ is selected from methyl, ethyl, propyl, hydroxyethyl, 2-hydroxypropyl, 1-methyl-2-hydroxyethyl, poly($C_2$-$C_3$ alkoxy), polyethoxy, benzyl, more preferably methyl or hydroxyethyl; each X is independently —$(CH_2)_n$—, —$CH_2$—$CH(CH_3)$— or —CH($CH_3$)—$CH_2$—, where each n is independently 1, 2, 3 or 4, preferably each n is 2; each Y is independently —O—(O)C— or —C(O)—O—; and A− is independently selected from the group consisting of chloride, bromide, methyl sulfate, ethyl sulfate, sulfate, and nitrate, preferably A− is selected from the group consisting of chloride and methyl sulfate, more preferably A− is methyl sulfate.

Each $R^1$ group may correspond to, and/or be derived from, the alkyl portion(s) of any of the parent fatty acids provided above. The $R^1$ groups may comprise, by weight average, from about 13 to about 22 carbon atoms, or from about 14 to about 20 carbon atoms, preferably from about 16 to about 18 carbon atoms. It may be that when Y is

*—O—(O)C— (where the * indicates the end nearest the X moiety), the sum of carbons in each $R^1$ is from 13 to 21, preferably from 13 to 19.

The quaternary ammonium compounds of the present disclosure may include a mixture of quaternary ammonium compounds according to Formula (I), for example, having some compounds where m=1 (e.g., monoesters), some compounds where m=2 (e.g., diesters), and some compounds where m=3 (e.g., triesters).

The quaternary ammonium compounds of the present disclosure may include compounds according to Formula (I), wherein each $R^2$ is a methyl group. The quaternary ammonium compounds of the present disclosure may include compounds according to Formula (I), wherein at least one $R^2$, preferably wherein at least one $R^2$ is a hydroxyethyl group and at least one $R^2$ is a methyl group. For compounds according to Formula (I), m may equal 1, and only one $R^2$ may be a hydroxyethyl group.

The quaternary ammonium compounds of the present disclosure may include methyl sulfate as a counterion. When the quaternary ammonium ester materials of the present disclosure comprise compounds according to Formula (I), A− may preferably be methyl sulfate. Without wishing to be bound by theory, it is believed that esterquats with a methyl sulphate as a counterion have lower electrostatic repulsive forces compared to those with chloride, as the methylsulphate counterion is bound more tightly compared to chloride. Therefore, it is believed that the electrostatic repulsive forces are relatively reduced because of the interaction between the esterquat and the methyl sulphate ions. Thus, methyl-sulphate-based esterquats may yield relatively less-charged structures, which may result in relatively stronger interactions with neutral surfaces. It is believed, then, that particles with a more neutral charge may interact more with these more neutral materials and/or surfaces of vesicles formed therefrom, resulting in more effective deposition onto target surfaces such as fabrics, compared to interactions between more positively charged capsules and such materials/vesicles.

It is understood that compositions that comprise a quaternary ammonium ester material as a fabric conditioning active may further comprise non-quaternized derivatives of such compounds, as well as unreacted reactants (e.g., free fatty acids).

Delivery Particles

The compositions of the present disclosure comprise a population of delivery particles. The delivery particles comprise a core and a shell surrounding the core. The core may comprise a benefit agent, and optionally a partitioning modifier. The core can be a liquid or a solid, preferably a liquid, at room temperature.

The composition may comprise from about 0.05% to about 20%, or from about 0.05% to about 10%, or from about 0.1% to about 5%, or from about 0.2% to about 2%, by weight of the composition, of delivery particles. The composition may comprise a sufficient amount of delivery particles to provide from about 0.05% to about 10%, or from about 0.1% to about 5%, or from about 0.1% to about 2%, by weight of the composition, of the encapsulated benefit agent, which may preferably be perfume raw materials, to the composition. When discussing herein the amount or weight percentage of the delivery particles, it is meant the sum of the wall material and the core material.

The population of delivery particles according to the present disclosure may be characterized by a volume-weighted median particle size from about 1 to about 100 microns, preferably from about 10 to about 100 microns, preferably from about 15 to about 50 microns, more preferably from about 20 to about 40 microns, even more preferably from about 20 to about 30 microns. Different particle sizes are obtainable by controlling droplet size during emulsification.

The delivery particles may be characterized by a ratio of core to shell up to 99:1, or even 99.5:1, on the basis of weight.

The delivery particles may be cationic, preferably cationic at a pH of 4.5. The delivery particles may be characterized by a zeta potential of at least 15 millivolts (mV) at a pH of 4.5. The delivery particles can be fashioned to have a zeta potential of at least 15 millivolts (mV) at a pH of 4.5, or even at least 40 mV at a pH of 4.5, or even at least 60 mV at a pH of 4.5. Polyurea capsules prepared with chitosan typically exhibit positive zeta potentials. Such capsules have improved deposition efficiency on fabrics. At higher pH, the particles may be able to be made nonionic or anionic.

The shell of the delivery particles comprises a polymeric material that may be the reaction product of a polyisocyanate and a chitosan. The chitosan may preferably be hydrolyzed chitosan. The shell may comprise a polyurea resin, where the polyurea resin comprises the reaction product of a polyisocyanate and chitosan, preferably hydrolyzed chitosan. The delivery particles of the present disclosure may be considered polyurea delivery particles and include a polyurea-chitosan shell. (As used herein, "shell" and "wall" are used interchangeably with regard to the delivery particles, unless indicated otherwise.) The shell may be derived from isocyanates and chitosan, preferably hydrolyzed chitosan. Without wishing to be bound by theory, it is believed that the present subject matter makes possible tailored surface charge of chitosan urea-based delivery particles by chemical attachment on the surface, especially the external surface of the delivery particle, through the charged domains or charged pendant groups of the resulting polymer.

The population of delivery particles may be made according to a process that comprises the following steps: forming a water phase by hydrolyzing chitosan in an aqueous acidic medium at a pH of 6.5 or less and a temperature of at least 60° C. for at least one hour; forming an oil phase comprising dissolving together at least one benefit agent and at least one polyisocyanate, optionally with an added oil; forming an emulsion by mixing under high shear agitation the water phase and the oil phase into an excess of the water phase, thereby forming droplets of the oil phase and benefit agent dispersed in the water phase, and optionally adjusting the pH of the emulsion to be in a range from pH 2 to pH 6; curing the emulsion by heating to at least 40° C., for a time sufficient to form a shell at an interface of the droplets with the water phase, the shell comprising the reaction product of the polyisocyanate and hydrolyzed chitosan, and the shell surrounding the core comprising the droplets of the oil phase and benefit agent. The curing may occur at a temperature up to about 100° C., more preferably up to about 90° C. The hydrolysis of the chitosan may occur at a temperature up to about 100° C., more preferably up to about 90° C. Such temperatures make it likely that the water remains (e.g., doesn't boil off), so that the desired reactions occur.

The shell of the delivery particles may comprise a polyurea resin, wherein the polyurea resin comprises the reaction product of a polyisocyanate and a chitosan, where the chitosan is first hydrolyzed in an acidic medium at a pH of 6.5 or less, preferably even less than pH 6.5, more preferably at a pH of from 3 to 6, and a temperature of at least 60° C. for at least one hour; where at least 21 wt % of the shell is comprised of moieties derived from the hydrolyzed chitosan; where the shell degrades at least 40% in 14 days (or less) when tested according to test method OECD 301B. The shell formed may be a chitosan-polyurea shell, having a chitosan content of at least 21 wt % based on the weight of the shell.

The delivery particles may be prepared by hydrolyzing chitosan in a first step and creating a water solution of the hydrolyzed chitosan. The hydrolyzed chitosan can be utilized at acidic to neutral pH as a cross-linker to form the shell of a core-shell delivery particle. A pH of at least 2, preferably at least 3, more preferably at least 4, is useful for the water phase to facilitate cross-linking of the hydrolyzed chitosan with the isocyanate monomer. The chitosan in the hydrolyzing step may preferably be depolymerized to a weight average molecular weight of about 95 kilodaltons (kDa) or less. The chitosan of the shell may be characterized by a degree of deacetylation of at least 50%, preferably at least 75%, more preferably at least 85%, or even at least 92%.

It may be preferred to use hydrolyzed chitosan to make the particles of the present disclosure. Without wishing to be bound by theory, it is believed that compared to un-hydrolyzed chitosan, hydrolyzed chitosan has improved solubility in water while also having the ability to act as an emulsifier, making it relatively easier to form delivery particles via interfacial polymerization, which includes an aqueous phase. Particles made from hydrolyzed chitosan may also exhibit favorable biodegradability profiles; for example, degradability tends to increase as the pH of the hydrolysis is decreased below pH 6.5, preferably below 6. Additionally or alternatively, hydrolyzed chitosan may be a more effective cross-linker when reacted with isocyanates/polyurea, perhaps due to its smaller size/lower molecular weight.

Chitosan used in the delivery particle formation process may be first hydrolyzed under acidic conditions (pH 6.5 or less). Optionally the chitosan is hydrolyzed at a pH of from 2 to 6.5, or even from a pH of from 4 to 6. This yields a deacetylated, depolymerized chitosan having water solubility, yet retaining an ability to act as an emulsifier or to replace the need for emulsifier, making additional emulsifiers optional. Small differences in reaction conditions can unexpectedly give rise to encapsulates with significantly different properties. The effect is believed to be more pronounced for reactions where in the chitosan hydrolyzation step, the pH is adjusted to around pH 4, or from pH 2-6, or from pH 3-5, but preferably from pH 3.5-5.

The chitosan may be hydrolyzed at a pH range from pH 2 to pH 6.5 and a temperature of at least 45° C. The chitosan in the hydrolyzing step is deacetylated to at least 75%, or even at least 80%, or at least 85%, or even at least 92%. The chitosan in the hydrolyzing step is depolymerized to a weight average molecular weight of 95 kDa or less.

In the present disclosure, hydrolyzed chitosan is taught used as both crosslinker and emulsifier to prepare polyurea delivery particles. Hydrolyzing has the benefit of deacetylating and depolymerizing chitosan, thereby solubilizing an otherwise difficult-to-handle material. Chitosan may be added into water in a jacketed reactor and at pH from 2 or even from 3 to 6.5, adjusted using acid such as concentrated HCl. The chitosan of this mixture may be hydrolyzed by heating to elevated temperature, such as 85° C. in 60 minutes, and then held at this temperature from 1 minute to 1440 minutes or longer. The water phase is then cooled to 25° C. Optionally, deacetylating may also be further facilitated or enhanced by enzymes to depolymerize or deacetylate the chitosan. An oil phase is prepared by dissolving an isocyanate such as trimers of xylylene Diisocyanate (XDI) or polymers of methylene diphenyl isocyanate (MDI), in oil at 25° C. Diluents, for example isopropyl myristate, may be used to adjust the hydrophilicity of the oil phase. The oil phase is then added into the water phase and milled at high speed to obtain a targeted size. The emulsion is then cured in one or more heating steps, such as heating to 40° C. in 30 minutes and holding at 40° C. for 60 minutes. Times and temperatures are approximate. The temperature and time are selected to be sufficient to form and cure a shell at the interface of the droplets of the oil phase with the water continuous phase. For example, the emulsion is heated to 85° C. in 60 minutes and then held at 85° C. for 360 minutes to cure the particles. The slurry is then cooled to room temperature.

Chitosan as a percentage by weight of the shell may be from about 21% up to about 95% of the shell. The ratio of the isocyanate monomer, oligomer, or prepolymer to hydrolyzed chitosan may be up to 1:10 by weight. The ratio of hydrolyzed chitosan in the water phase as compared to the isocyanate in the oil phase may be, based on weight, from 21:79 to 90:10, or even from 1:2 to 10:1, or even from 1:1 to 7:1. The shell may comprise chitosan at a level of 21 wt % or even greater, preferably from about 21 wt % to about 90 wt %, or even from 21 wt % to 85 wt %, or even 21 wt % to 75 wt %, or 21 wt % to 55 wt % of the total shell being chitosan.

The polyisocyanate useful in the invention is to be understood for purposes hereof as isocyanate monomer, isocyanate oligomer, isocyanate prepolymer, or dimer or trimer of an aliphatic or aromatic isocyanate. All such monomers, prepolymers, oligomers, or dimers or trimers of aliphatic or aromatic isocyanates are intended encompassed by the term "polyisocyanate" herein.

The polyisocyanate may be an aliphatic or aromatic monomer, oligomer or prepolymer, usefully comprising two or more isocyanate functional groups. The polyisocyanate may preferably be selected from a group comprising toluene diisocyanate, a trimethylol propane adduct of toluene diisocyanate and a trimethylol propane adduct of xylylene diisocyanate, methylene diphenyl isocyanate, toluene diisocyanate, tetramethylxylidene diisocyanate, naphthalene-1,5-diisocyanate, and phenylene diisocyanate.

The polyisocyanate, for example, can be selected from aromatic toluene diisocyanate and its derivatives used in wall formation for encapsulates, or aliphatic monomer, oligomer or prepolymer, for example, hexamethylene diisocyanate and dimers or trimers thereof, or 3,3,5-trimethyl-5-isocyanatomethyl-1-isocyanato cyclohexane tetramethylene diisocyanate. The polyisocyanate can be selected from 1,3-diisocyanato-2-methylbenzene, hydrogenated MDI, bis(4-isocyanatocyclohexyl)methane, dicyclohexylmethane-4,4'-diisocyanate, and oligomers and prepolymers thereof. This listing is illustrative and not intended to be limiting of the polyisocyanates useful in the present disclosure.

The polyisocyanates useful in the invention comprise isocyanate monomers, oligomers or prepolymers, or dimers or trimers thereof, having at least two isocyanate groups. Optimal cross-linking can be achieved with polyisocyanates having at least three functional groups.

Polyisocyanates, for purposes of the present disclosure, are understood as encompassing any polyisocyanate having at least two isocyanate groups and comprising an aliphatic or aromatic moiety in the monomer, oligomer, or prepolymer. If aromatic, the aromatic moiety can comprise a phenyl, a toluyl, a xylyl, a naphthyl or a diphenyl moiety, more preferably a toluyl or a xylyl moiety. Aromatic polyisocyanates, for purposes herein, can include diisocyanate derivatives such as biurets and polyisocyanurates. The polyisocyanate, when aromatic, can be, but is not limited to, methylene diphenyl isocyanate, toluene diisocyanate, tetramethylxylidene diisocyanate, polyisocyanurate of toluene diisocyanate (commercially available from Bayer under the tradename Desmodur® RC), trimethylol propane-adduct of toluene diisocyanate (commercially available from Bayer under the tradename Desmodur® L75), or trimethylol propane-adduct of xylylene diisocyanate (commercially available from Mitsui Chemicals under the tradename Takenate® D-110N), naphthalene-1,5-diisocyanate, and phenylene diisocyanate.

There is a preference for aromatic polyisocyanate; however, aliphatic polyisocyanates and blends thereof may be useful. Aliphatic polyisocyanate is understood as a polyisocyanate which does not comprise any aromatic moiety. Aliphatic polyisocyanates include a trimer of hexamethylene diisocyanate, a trimer of isophorone diisocyanate, a trimethylol propane-adduct of hexamethylene diisocyanate (available from Mitsui Chemicals) or a biuret of hexamethylene diisocyanate (commercially available from Bayer under the tradename Desmodur® N 100).

The particle shell may also be reinforced using additional co-crosslinkers such as multifunctional amines and/or polyamines such as diethylene triamine (DETA), polyethylene imine, polyvinyl amine, or mixtures thereof.

The shell may be present at a level of from about 1 to 15 percent by weight of the delivery particle. The shell may be present at a level of least 1%, preferably at least 3%, more preferably at least 5% by weight of the delivery particle. The shell may be present at a level of up to about 15% by weight of the delivery particle.

The shell may degrade at least 50% after 20 days (or less) when tested according to test method OECD 301B. The shell may preferably degrade at least 60% of its mass after 60 days (or less) when tested according to test method OECD 301B. The shell may degrade from 30-100%, preferably 40-100%, 50-100%, 60-100%, or 60-95%, in 60 days, preferably 50 days, more preferably 40 days, more preferably 28 days, more preferably 14 days.

The delivery particles of the present disclosure include a core. The core comprises a benefit agent. The core optionally comprises a partitioning modifier.

The core of a particle is surrounded by the shell. When the shell is ruptured, the benefit agent in the core is released. Suitable benefit agents located in the core may include benefit agents that provide benefits to a surface, such as a fabric or hair.

The core may comprise from about 5% to about 100%, by weight of the core, of a benefit agent, which may preferably comprise a fragrance. The core may comprise from about 45% to about 95%, preferably from about 50% to about 80%, more preferably from about 50% to about 70%, by weight of the core, of the benefit agent, which may preferably comprise a fragrance.

The benefit agent may comprise an aldehyde-comprising benefit agent, a ketone-comprising benefit agent, or a combination thereof. Such benefit agents, such as aldehyde- or ketone-containing perfume raw materials, are known to provide preferred benefits, such as freshness benefits. The benefit agent may comprise at least about 20%, preferably at least about 25%, more preferably at least about 40%, even more preferably at least about 50%, by weight of the benefit agent, of aldehyde-containing benefit agents, ketone-containing benefit agents, or combinations thereof.

The benefit agent may be a hydrophobic benefit agent. Such agents are compatible with the oil phases that are common in making the delivery particles of the present disclosure.

The benefit agent may be selected from the group consisting of fragrance, silicone oils, waxes, hydrocarbons, higher fatty acids, essential oils, lubricants, lipids, skin coolants, vitamins, sunscreens, antioxidants, glycerine, catalysts, bleach particles, silicon dioxide particles, malodor reducing agents, odor-controlling materials, chelating agents, antistatic agents, softening agents, insect and moth repelling agents, colorants, antioxidants, chelants, bodying agents, drape and form control agents, smoothness agents, wrinkle control agents, sanitization agents, disinfecting agents, germ control agents, mold control agents, mildew control agents, antiviral agents, drying agents, stain resistance agents, soil release agents, fabric refreshing agents and freshness extending agents, chlorine bleach odor control agents, dye fixatives, dye transfer inhibitors, color maintenance agents, optical brighteners, color restoration/rejuvenation agents, anti-fading agents, whiteness enhancers, anti-abrasion agents, wear resistance agents, fabric integrity agents, anti-wear agents, anti-pilling agents, defoamers, anti-foaming agents, UV protection agents, sun fade inhibitors, anti-allergenic agents, enzymes, water proofing agents, fabric comfort agents, shrinkage resistance agents, stretch resistance agents, stretch recovery agents, skin care agents, glycerin, synthetic or natural actives, antibacterial actives, antiperspirant actives, cationic polymers, dyes, and mixtures thereof.

The encapsulated benefit agent may preferably comprise a fragrance, which may include one or more perfume raw materials. Fragrance is particularly suitable for encapsulation in the presently described delivery particles, as the fragrance-containing particles can provide freshness benefits across multiple touchpoints.

The term "perfume raw material" (or "PRM") as used herein refers to compounds having a molecular weight of at least about 100 g/mol and which are useful in imparting an odor, fragrance, essence or scent, either alone or with other perfume raw materials. Typical PRMs comprise inter alia alcohols, ketones, aldehydes, esters, ethers, nitrites and alkenes, such as terpene. A listing of common PRMs can be found in various reference sources, for example, "Perfume and Flavor Chemicals", Vols. I and II; Steffen Arctander Allured Pub. Co. (1994) and "Perfumes: Art, Science and Technology", Miller, P. M. and Lamparsky, D., Blackie Academic and Professional (1994).

The PRMs may be characterized by their boiling points (B.P.) measured at the normal pressure (760 mm Hg), and their octanol/water partitioning coefficient (P), which may be described in terms of log P, determined according to the test method below. Based on these characteristics, the PRMs may be categorized as Quadrant I, Quadrant II, Quadrant III, or Quadrant IV perfumes, as described in more detail below.

The fragrance may comprise perfume raw materials that have a log P of from about 2.5 to about 4. It is understood that other perfume raw materials may also be present in the fragrance.

The perfume raw materials may comprise a perfume raw material selected from the group consisting of perfume raw materials having a boiling point (B.P.) lower than about 250° C. and a log P lower than about 3, perfume raw materials having a B.P. of greater than about 250° C. and a log P of greater than about 3, perfume raw materials having a B.P. of greater than about 250° C. and a log P lower than about 3, perfume raw materials having a B.P. lower than about 250°

C. and a log P greater than about 3 and mixtures thereof. Perfume raw materials having a boiling point B.P. lower than about 250° C. and a log P lower than about 3 are known as Quadrant I perfume raw materials. Quadrant 1 perfume raw materials are preferably limited to less than 30% of the perfume composition. Perfume raw materials having a B.P. of greater than about 250° C. and a log P of greater than about 3 are known as Quadrant IV perfume raw materials, perfume raw materials having a B.P. of greater than about 250° C. and a log P lower than about 3 are known as Quadrant II perfume raw materials, perfume raw materials having a B.P. lower than about 250° C. and a log P greater than about 3 are known as a Quadrant III perfume raw materials. Suitable Quadrant I, II, III and IV perfume raw materials are disclosed in U.S. Pat. No. 6,869,923 B1.

The consumer product composition according to any preceding claim, wherein the benefit agent comprises fragrance, preferably wherein the fragrance comprises at least about 20%, preferably at least about 25%, more preferably at least about 40%, even more preferably at least about 50%, by weight of the fragrance, of aldehyde-containing perfume raw materials, ketone-containing perfume raw materials, or combinations thereof.

Preferred aldehyde-containing perfume raw materials may include: methyl nonyl acetaldehyde: benzaldehyde; floralozone; isocyclocitral; triplal (ligustral); precyclemone B; lilial; decyl aldehyde; undecylenic aldehyde; cyclamen homoaldehyde; cyclamen aldehyde; dupical; oncidal; adoxal; melonal; calypsone; anisic aldehyde; heliotropin; cuminic aldehyde; scentenal; 3,6-dimethylcyclohex-3-ene-1-carbaldehyde; satinaldehyde; canthoxal; vanillin; ethyl vanillin; cinnamic aldehyde; cis-4-decenal; trans-4-decenal; cis-7-decenal; undecylenic aldehyde; trans hexenal; trans-2-octenal; 2-undecenal; 2,4-dodecadeienal; cis-4-heptenal; Florydral; butyl cinnamaldehyde; limonelal; amyl cinnamaldehyde; hexyl cinnamaldehyde; citronellal; citral; cis-3-hexen-1-al; or mixtures thereof.

Preferred ketone-containing raw materials may include: nerolione; 4-(4-methoxyphenyl)butan-2-one; 1-naphthalen-2-ylethanone; nectaryl; trimofix O; fleuramone; delta-damascone; beta-damascone; alpha-damascone; methyl ionone; 2-hexylcyclopent-2-en-1-one; galbascone; or mixtures thereof.

The core of the delivery particles of the present disclosure may comprise a partitioning modifier, which may facilitate more robust shell formation. The partitioning modifier may be combined with the core's perfume oil material prior to incorporation of the wall-forming monomers. The partitioning modifier may be present in the core at a level of from about 5% to about 55%, preferably from about 10% to about 50%, more preferably from about 25% to about 50%, by weight of the core.

The partitioning modifier may comprise a material selected from the group consisting of vegetable oil, modified vegetable oil, mono-, di-, and tri-esters of $C_4$-$C_{24}$ fatty acids, isopropyl myristate, dodecanophenone, lauryl laurate, methyl behenate, methyl laurate, methyl palmitate, methyl stearate, and mixtures thereof. The partitioning modifier may preferably comprise or even consist of isopropyl myristate. The modified vegetable oil may be esterified and/or brominated. The modified vegetable oil may preferably comprise castor oil and/or soy bean oil. US Patent Application Publication 20110268802, incorporated herein by reference, describes other partitioning modifiers that may be useful in the presently described delivery particles.

Where the benefit agent is not itself sufficient to serve as the oil phase or solvent, particularly for the wall forming materials, the oil phase can comprise a suitable carrier and/or solvent. In this sense, the oil is optional, as the benefit agent itself can at times be the oil. These carriers or solvents are generally an oil, preferably have a boiling point greater than about 80° C. and low volatility and are non-flammable. Though not limited thereto, they preferably comprise one or more esters, preferably with chain lengths of up to 18 carbon atoms or even up to 42 carbon atoms and/or triglycerides such as the esters of C6 to C12 fatty acids and glycerol. Exemplary carriers and solvents include, but are not limited to: ethyldiphenylmethane; isopropyl diphenylethane; butyl biphenyl ethane; benzylxylene; alkyl biphenyls such as propylbiphenyl and butylbiphenyl; dialkyl phthalates e.g. dibutyl phthalate, dioctylphthalate, dinonyl phthalate and ditridecylphthalate; 2,2,4-trimethyl-1,3-pentanediol diisobutyrate; alkyl benzenes such as dodecyl benzene; alkyl or aralkyl benzoates such as benzyl benzoate; diaryl ethers; di(aralkyl)ethers and aryl aralkyl ethers; ethers such as diphenyl ether, dibenzyl ether and phenyl benzyl ether; liquid higher alkyl ketones (having at least 9 carbon atoms); alkyl or aralkyl benzoates, e.g., benzyl benzoate; alkylated naphthalenes such as dipropylnaphthalene; partially hydrogenated terphenyls; high-boiling straight or branched chain hydrocarbons; alkaryl hydrocarbons such as toluene; vegetable and other crop oils such as canola oil, soybean oil, corn oil, sunflower oil, cottonseed oil, lemon oil, olive oil and pine oil; methyl esters of fatty acids derived from transesterification of vegetable and other crop oils, methyl ester of oleic acid, esters of vegetable oil, e.g. soybean methyl ester, straight chain paraffinic aliphatic hydrocarbons, and mixtures of the foregoing.

Optionally, the water phase may include an emulsifier. Non-limiting examples of emulsifiers include water-soluble salts of alkyl sulfates, alkyl ether sulfates, alkyl isothionates, alkyl carboxylates, alkyl sulfosuccinates, alkyl succinamates, alkyl sulfate salts such as sodium dodecyl sulfate, alkyl sarcosinates, alkyl derivatives of protein hydrolyzates, acyl aspartates, alkyl or alkyl ether or alkylaryl ether phosphate esters, sodium dodecyl sulphate, phospholipids or lecithin, or soaps, sodium, potassium or ammonium stearate, oleate or palmitate, alkylarylsulfonic acid salts such as sodium dodecylbenzenesulfonate, sodium dialkylsulfosuccinates, dioctyl sulfosuccinate, sodium dilaurylsulfosuccinate, poly(styrene sulfonate) sodium salt, isobutylene-maleic anhydride copolymer, gum arabic, sodium alginate, carboxymethylcellulose, cellulose sulfate and pectin, poly (styrene sulfonate), isobutylene-maleic anhydride copolymer, carrageenan, sodium alginate, pectic acid, tragacanth gum, almond gum and agar; semi-synthetic polymers such as carboxymethyl cellulose, sulfated cellulose, sulfated methylcellulose, carboxymethyl starch, phosphated starch, lignin sulfonic acid; and synthetic polymers such as maleic anhydride copolymers (including hydrolyzates thereof), polyacrylic acid, polymethacrylic acid, acrylic acid butyl acrylate copolymer or crotonic acid homopolymers and copolymers, vinyl benzenesulfonic acid or 2-acrylamido-2-methylpropanesulfonic acid homopolymers and copolymers, and partial amide or partial ester of such polymers and copolymers, carboxy modified polyvinyl alcohol, sulfonic acid-modified polyvinyl alcohol and phosphoric acid-modified polyvinyl alcohol, phosphated or sulfated tristyrylphenol ethoxylates, palmitamidopropyltrimonium chloride (Varisoft PATC™, available from Degussa Evonik, Essen, Germany), distearyl dimonium chloride, cetyltrimethylammonium chloride, quaternary ammonium compounds, fatty amines, aliphatic ammonium halides, alkyldimethylbenzylammonium halides, alkyldimethylethylammonium halides, polyethyleneimine, poly(2-dimethylamino)ethyl methacrylate) methyl chloride quaternary salt, poly(l-vinylpyrrolidone-co-2-dimethylaminoethyl methacrylate), poly(acrylamide-co-di allyldimethylammonium chloride), poly (allylamine), poly[bis(2-chloroethyl) ether-alt-1,3-bis[3-(dimethylamino)propyl]urea] quaternized, and poly (dimethylamine-co-epichlorohydrin-co-ethylenediamine), condensation products of aliphatic amines with alkylene oxide, quaternary ammonium compounds with a long-chain aliphatic radical, e.g. distearyldiammonium chloride, and fatty amines, alkyldimethylbenzylammonium halides, alkyldimethylethylammonium halides, polyalkylene glycol ether, condensation products of alkyl phenols, aliphatic alcohols, or fatty acids with alkylene oxide, ethoxylated alkyl phenols, ethoxylated aryl phenols, ethoxylated polyaryl phenols, carboxylic esters solubilized with a polyol, polyvinyl alcohol, polyvinyl acetate, or copolymers of polyvinyl alcohol polyvinyl acetate, polyacrylamide, poly(N-isopropylacrylamide), poly(2-hydroxypropyl methacrylate), poly(-ethyl-2-oxazoline), poly(2-isopropenyl-2-oxazoline-co-methyl methacrylate), poly(methyl vinyl ether), and polyvinyl alcohol-co-ethylene), and cocoamidopropyl betaine. Emulsifier, if employed, is typically from about 0.1 to 40% by weight, preferably 0.2 to about 15% by weight, more typically 0.5 to 10% be weight, based on total weight of the formulation Delivery particles may also have varying ratios of the partitioning modifier to the benefit agent so as to make different populations of delivery particles that may have different bloom patterns. Such populations may also incorporate different perfume oils so as to make populations of delivery particles that display different bloom patterns and different scent experiences. US 2011-0268802 discloses other non-limiting examples of delivery particles and partitioning modifiers and is hereby incorporated by reference.

In the formation of the chitosan delivery particles, the aqueous solution may contain a residual quantity of the hydrolyzed chitosan. This provides the option of dewatering the delivery particles such as through decanting, filtration, centrifuging or other separation technique. Alternatively, the aqueous slurry of chitosan polyurea delivery particles can be spray dried forming chitosan polyurea delivery particles further coated with a layer of the residual hydrolyzed chitosan from the water phase.

The formed slurry of delivery particles can be further dispersed in additional water or with low concentration of residual overcoating hydrolyzed chitosan yielding chitosan polyurea delivery particles that can fracture upon drying, providing an additional release mechanism useful in some applications such as fragrance delivery or with agricultural actives for targeted delivery.

The population of delivery particles may comprise of one or more distinct populations. The composition may have at least two different populations of delivery particles that vary in the exact make-up of the perfume oil and in the median particle size and/or partitioning modifier to perfume oil (PM:PO) weight ratio. In some examples, the composition includes more than two distinct populations that vary in the exact make up the perfume oil and in their fracture strengths. In some further examples, the populations of delivery particles can vary with respect to the weight ratio of the partitioning modifier to the perfume oil(s). In some examples, the composition can include a first population of delivery particles having a first ratio that is a weight ratio of from 2:3 to 3:2 of the partitioning modifier to a first perfume oil and a second population of delivery particles having a second ratio that is a weight ratio of less than 2:3 but greater than 0 of the partitioning modifier to a second perfume oil.

Each distinct population of delivery particles may be preparable in a distinct slurry. For example, the first population of delivery particles can be contained in a first slurry and the second population of delivery particles contained in a second slurry. It is to be appreciated that the number of distinct slurries for combination is without limit and a choice of the formulator such that 3, 10, or 15 distinct slurries may be combined. The first and second populations of delivery particles may vary in the exact make up the perfume oil and in the median particle size and/or PM:PO weight ratio.

The compositions of the present disclosure can be prepared by combining the first and second slurries with at least one adjunct ingredient and optionally packaged in a container. The first and second populations of delivery particles can be prepared in distinct slurries and then spray dried to form a particulate. The distinct slurries may be combined before spray drying, or spray dried individually and then combined together when in particulate powder form. Once in powder form, the first and second populations of delivery particles may be combined with an adjunct ingredient to form the composition useful as a feedstock for manufacture of consumer, industrial, medical or other goods. At least one population of delivery particles is spray dried and combined with a slurry of a second population of delivery particles. At least one population of delivery particles may be dried, prepared by spray drying, fluid bed drying, tray drying, or other such drying processes that are available.

The composition can be prepared by combining the first and second slurries with at least one adjunct ingredient and optionally packaged in a container. The first and second populations of delivery particles can be prepared in distinct slurries and then spray dried to form a particulate. The distinct slurries may be combined before spray drying, or spray dried individually and then combined together when in particulate powder form. Once in powder form, the first and second populations of delivery particles may be combined with an adjunct ingredient to form the composition useful as a feedstock for manufacture of consumer, industrial, medical or other goods. At least one population of delivery particles may be is spray dried and combined with a slurry of a second population of delivery particles. At least one population of delivery particles may be dried, prepared by spray drying, fluid bed drying, tray drying, or other such drying processes that are available.

The slurry or dry particulates can include one or more adjunct materials such as processing aids selected from the group consisting of a carrier, an aggregate inhibiting material, a deposition aid, a particle suspending polymer, and mixtures thereof. Non-limiting examples of aggregate inhibiting materials include salts that can have a charge-shielding effect around the particle, such as magnesium chloride, calcium chloride, magnesium bromide, magnesium sulfate, and mixtures thereof. Non-limiting examples of particle suspending polymers include polymers such as xanthan gum, carrageenan gum, guar gum, shellac, alginates, chitosan; cellulosic materials such as carboxymethyl cellulose, hydroxypropyl methyl cellulose, cationically charged cellulosic materials; polyacrylic acid; polyvinyl alcohol; hydrogenated castor oil; ethylene glycol distearate; and mixtures thereof.

The slurry can include one or more processing aids, which may be include water, aggregate inhibiting materials such as divalent salts, or particle suspending polymers such as xanthan gum, guar gum, and/or carboxy methyl cellulose.

The slurry can include one or more carriers selected from the group consisting of polar solvents, including but not limited to, water, ethylene glycol, propylene glycol, polyethylene glycol, glycerol; nonpolar solvents, including but not limited to, mineral oil, perfume raw materials, silicone oils, hydrocarbon paraffin oils, and mixtures thereof.

The slurry may include a deposition aid that may comprise a polymer selected from the group comprising: polysaccharides, in one aspect, cationically modified starch and/or cationically modified guar; polysiloxanes; poly diallyl dimethyl ammonium halides; copolymers of poly diallyl dimethyl ammonium chloride and polyvinyl pyrrolidone; a composition comprising polyethylene glycol and polyvinyl pyrrolidone; acrylamides; imidazoles; imidazolinium halides; polyvinyl amine; copolymers of poly vinyl amine and N-vinyl formamide; polyvinyl formamide, polyvinyl alcohol; polyvinyl alcohol crosslinked with boric acid; polyacrylic acid; polyglycerol ether silicone cross-polymers; polyacrylic acids, polyacrylates, copolymers of polyvinylamine and polvyinylalcohol oligomers of amines, in one aspect a diethylenetriamine, ethylene diamine, bis(3-aminopropyl)piperazine, N,N-Bis-(3-aminopropyl)methylamine, tris(2-aminoethyl)amine and mixtures thereof; polyethyleneimine, a derivatized polyethyleneimine, in one aspect an ethoxylated polyethyleneimine; a polymeric compound comprising, at least two moieties selected from the moieties consisting of a carboxylic acid moiety, an amine moiety, a hydroxyl moiety, and a nitrile moiety on a backbone of polybutadiene, polyisoprene, polybutadiene/styrene, polybutadiene/acrylonitrile, carboxyl-terminated polybutadiene/acrylonitrile or combinations thereof pre-formed coacervates of anionic surfactants combined with cationic polymers; polyamines and mixtures thereof.

At least one population of delivery particles may be contained in an agglomerate and then combined with a distinct population of delivery particles and at least one adjunct material. Said agglomerate may comprise materials selected from the group consisting of silicas, citric acid, sodium carbonate, sodium sulfate, sodium chloride, and binders such as sodium silicates, modified celluloses, polyethylene glycols, polyacrylates, polyacrylic acids, zeolites and mixtures thereof.

Suitable equipment for use in the processes disclosed herein may include continuous stirred tank reactors, homogenizers, turbine agitators, recirculating pumps, paddle mixers, plough shear mixers, ribbon blenders, vertical axis granulators and drum mixers, both in batch and, where available, in continuous process configurations, spray dryers, and extruders. Such equipment can be obtained from Lodige GmbH (Paderborn, Germany), Littleford Day, Inc. (Florence, Ky., U.S.A.), Forberg AS (Larvik, Norway), Glatt Ingenieurtechnik GmbH (Weimar, Germany), Niro (Soeborg, Denmark), Hosokawa Bepex Corp. (Minneapolis, Minn., U.S.A.), Arde Barinco (New Jersey, U.S.A.).

The population of microcapsules may be part of an aqueous slurry that includes (residual) hydrolyzed chitosan in the slurry. The aqueous slurry may be spray dried, forming microcapsules overcoated with a layer of residual hydrolyzed chitosan deposited onto the microcapsules from the slurry.

The process may include drying the delivery particles, and where the delivery particles fracture upon drying, thereby releasing the core. Dry-pop type capsules, which fracture on drying, are formed through controlling reaction conditions such as controlling cure time and controlling temperature to yield capsules with thinner walls. Higher cure temperatures, along with longer cure times, can promote higher crosslinking density and enhanced brittleness. A thinner wall, such as from 0.1 nanometer to about 300 nanometers, tends to lend itself to becoming brittle on drying. Even in the dry-pop embodiment, the capsules of the present disclosure can exhibit lower leakage and better retention of the core in the capsule slurry pre-drying.

Adjunct Materials

The fabric care compositions of the present disclosure may comprise one or more adjunct materials in addition to the ester quat material and the delivery particles. The adjunct material may provide a benefit in the intended end-use of a composition, or it may be a processing and/or stability aid.

Suitable adjunct materials may include: surfactants, additional conditioning actives, deposition aids, rheology modifiers or structurants, bleach systems, stabilizers, builders, chelating agents, dye transfer inhibiting agents, dispersants, enzymes, and enzyme stabilizers, catalytic metal complexes, polymeric dispersing agents, clay and soil removal/anti-redeposition agents, brighteners, suds suppressors, silicones, hueing agents, aesthetic dyes, additional perfumes and perfume delivery systems, structure elasticizing agents, carriers, hydrotropes, processing aids, anti-agglomeration agents, coatings, formaldehyde scavengers, and/or pigments. Preferably, the adjunct materials comprise additional fabric conditioning agents, dyes, pH control agents, solvents, rheology modifiers, structurants, cationic polymers, surfactants, perfume, additional perfume delivery systems, chelants, antioxidants, preservatives, or mixtures thereof.

Depending on the intended form, formulation, and/or end-use, compositions of the present disclosure might not contain one or more of the following adjuncts materials: bleach activators, surfactants, builders, chelating agents, dye transfer inhibiting agents, dispersants, enzymes, and enzyme stabilizers, catalytic metal complexes, polymeric dispersing agents, clay and soil removal/anti-redeposition agents, brighteners, suds suppressors, dyes, additional perfumes and perfume delivery systems, structure elasticizing agents, fabric softeners, carriers, hydrotropes, processing aids, structurants, anti-agglomeration agents, coatings, formaldehyde scavengers, and/or pigments.

The precise nature of these additional components, and levels of incorporation thereof, will depend on the physical form of the composition and the nature of the operation for which it is to be used. However, when one or more adjuncts are present, such one or more adjuncts may be present as detailed below. The following is a non-limiting list of suitable additional adjuncts.

A. Surfactants

The compositions of the present disclosure may comprise surfactant. Surfactants may be useful for providing, for example, cleaning benefits. The compositions may comprise a surfactant system, which may contain one or more surfactants.

The compositions of the present disclosure may include from about 0.1% to about 70%, or from about 2% to about 60%, or from about 5% to about 50%, by weight of the composition, of a surfactant system. Liquid compositions may include from about 5% to about 40%, by weight of the composition, of a surfactant system. Compact formulations, including compact liquids, gels, and/or compositions suitable for a unit dose form, may include from about 25% to about 70%, or from about 30% to about 50%, by weight of the composition, of a surfactant system.

The surfactant system may include anionic surfactant, nonionic surfactant, zwitterionic surfactant, cationic surfactant, amphoteric surfactant, or combinations thereof. The surfactant system may include linear alkyl benzene sulfonate, alkyl ethoxylated sulfate, alkyl sulfate, nonionic surfactant such as ethoxylated alcohol, amine oxide, or mixtures thereof. The surfactants may be, at least in part, derived from natural sources, such as natural feedstock alcohols.

Suitable anionic surfactants may include any conventional anionic surfactant. This may include a sulfate detersive surfactant, for e.g., alkoxylated and/or non-alkoxylated alkyl sulfate materials, and/or sulfonic detersive surfactants, e.g., alkyl benzene sulfonates. The anionic surfactants may be linear, branched, or combinations thereof. Preferred surfactants include linear alkyl benzene sulfonate (LAS), alkyl ethoxylated sulfate (AES), alkyl sulfates (AS), or mixtures thereof. Other suitable anionic surfactants include branched modified alkyl benzene sulfonates (MLAS), methyl ester sulfonates (MES), sodium lauryl sulfate (SLS), sodium lauryl ether sulfate (SLES), and/or alkyl ethoxylated carboxylates (AEC). The anionic surfactants may be present in acid form, salt form, or mixtures thereof. The anionic surfactants may be neutralized, in part or in whole, for example, by an alkali metal (e.g., sodium) or an amine (e.g., monoethanolamine). Due to the presence of cationic ester quat material, it may be desirable to limit the amount of anionic surfactant so as to avoid undesirable interactions of the materials; for example, the compositions may comprise less than 5%, preferably less than 3%, more preferably less than 1%, even more preferably less than 0.1%, by weight of the composition, of anionic surfactant.

The surfactant system may include nonionic surfactant. Suitable nonionic surfactants include alkoxylated fatty alcohols, such as ethoxylated fatty alcohols. Other suitable nonionic surfactants include alkoxylated alkyl phenols, alkyl phenol condensates, mid-chain branched alcohols, mid-chain branched alkyl alkoxylates, alkylpolysaccharides (e.g., alkylpolyglycosides), polyhydroxy fatty acid amides, ether capped poly(oxyalkylated) alcohol surfactants, and mixtures thereof. The alkoxylate units may be ethyleneoxy units, propyleneoxy units, or mixtures thereof. The nonionic surfactants may be linear, branched (e.g., mid-chain branched), or a combination thereof. Specific nonionic surfactants may include alcohols having an average of from about 12 to about 16 carbons, and an average of from about 3 to about 9 ethoxy groups, such as C12-C14 EO7 nonionic surfactant.

Suitable zwitterionic surfactants may include any conventional zwitterionic surfactant, such as betaines, including alkyl dimethyl betaine and cocodimethyl amidopropyl betaine, $C_8$ to $C_{18}$ (for example from $C_{12}$ to $C_{18}$) amine oxides (e.g., $C_{12-14}$ dimethyl amine oxide), and/or sulfo and hydroxy betaines, such as N-alkyl-N,N-dimethylammino-1-propane sulfonate where the alkyl group can be $C_8$ to $C_{18}$, or from $C_{10}$ to $C_{14}$. The zwitterionic surfactant may include amine oxide.

Depending on the formulation and/or the intended end-use, the composition may be substantially free of certain surfactants. For example, liquid fabric enhancer compositions, such as fabric softeners, may be substantially free of anionic surfactant, as such surfactants may negatively interact with cationic ingredients.

B. Additional Conditioning Active

In addition to the ester quat material described above, the fabric care compositions of the present disclosure may comprise other conditioning actives. The additional conditioning actives may be selected from the group consisting of silicones, non-ester quaternary ammonium compounds, amines, fatty esters, sucrose esters, silicones, dispersible polyolefins, polysaccharides, fatty acids, softening or conditioning oils, polymer latexes, glyceride copolymers, and combinations thereof, preferably silicones.

When the composition further comprises silicone, the quaternary ammonium ester material and the silicone may be present in a weight ratio of from about 1:10 to about 10:1, or from about 1:5 to about 5:1, or from about 1:3 to about 1:3, or from about 1:2 to about 2:1, or about 1:1.5 to about 1.5:1, or about 1:1.

Conditioning actives may be present at a level of from about 1% to about 99%, by weight of the composition. The composition may include from about 1%, or from about 2%, or from about 3%, to about 99%, or to about 75%, or to about 50%, or to about 40%, or to about 35%, or to about 30%, or to about 25%, or to about 20%, or to about 15%, or to about 10%, by weight of the composition, of conditioning active. The composition may include from about 5% to about 30%, by weight of the composition, of conditioning active.

Conditioning actives suitable for compositions of the present disclosure may include quaternary ammonium ester compounds, silicones, non-ester quaternary ammonium compounds, amines, fatty esters, sucrose esters, silicones, dispersible polyolefins, polysaccharides, fatty acids, softening or conditioning oils, polymer latexes, or combinations thereof.

The composition may include the quaternary ammonium ester material and a silicone. The combined total amount of quaternary ammonium ester material and silicone may be from about 5% to about 70%, or from about 6% to about 50%, or from about 7% to about 40%, or from about 10% to about 30%, or from about 15% to about 25%, by weight of the composition. The composition may include quaternary ammonium ester material and silicone in a weight ratio of from about 1:10 to about 10:1, or from about 1:5 to about 5:1, or from about 1:3 to about 1:3, or from about 1:2 to about 2:1, or about 1:1.5 to about 1.5:1, or about 1:1.

C. Deposition Aid

The compositions of the present disclosure may comprise a deposition aid. As described above, due to the synergistic benefits that flow from the ester quat material and the delivery particles of the present disclosure, relatively less (or even none) of a deposition aid may be require to provide comparable or even improved performance; alternatively, a deposition aid may be used in compositions of the present disclosure to boost performance even more.

Deposition aids can facilitate deposition of delivery particles, conditioning actives, perfumes, or combinations thereof, improving the performance benefits of the compositions and/or allowing for more efficient formulation of such benefit agents. The composition may comprise, by weight of the composition, from 0.0001% to 3%, preferably from 0.0005% to 2%, more preferably from 0.001% to 1%, or from about 0.01% to about 0.5%, or from about 0.05% to about 0.3%, of a deposition aid. The deposition aid may be a cationic or amphoteric polymer, preferably a cationic polymer.

Cationic polymers in general and their methods of manufacture are known in the literature. Suitable cationic polymers may include quaternary ammonium polymers known the "Polyquaternium" polymers, as designated by the International Nomenclature for Cosmetic Ingredients, such as Polyquaternium-6 (poly(diallyldimethylammonium chloride), Polyquaternium-7 (copolymer of acrylamide and diallyldimethylammonium chloride), Polyquaternium-10 (quaternized hydroxyethyl cellulose), Polyquaternium-22 (copolymer of acrylic acid and diallyldimethylammonium chloride), and the like.

The deposition aid may be selected from the group consisting of polyvinylformamide, partially hydroxylated polyvinylformamide, polyvinylamine, polyethylene imine, ethoxylated polyethylene imine, polyvinylalcohol, polyacrylates, and combinations thereof. The cationic polymer may comprise a cationic acrylate.

Deposition aids can be added concomitantly with delivery particles (at the same time with, e.g., encapsulated benefit agents) or directly/independently in the consumer product composition. The weight-average molecular weight of the polymer may be from 500 to 5000000 or from 1000 to 2000000 or from 2500 to 1500000 Dalton, as determined by size exclusion chromatography relative to polyethyleneoxide standards using Refractive Index (RI) detection. The weight-average molecular weight of the cationic polymer may be from 5000 to 37500 Dalton.

D. Rheology Modifier/Structurant

The compositions of the present disclosure may contain a rheology modifier and/or a structurant. Rheology modifiers may be used to "thicken" or "thin" liquid compositions to a desired viscosity. Structurants may be used to facilitate phase stability and/or to suspend or inhibit aggregation of particles in liquid composition, such as the delivery particles as described herein.

Suitable rheology modifiers and/or structurants may include non-polymeric crystalline hydroxyl functional structurants (including those based on hydrogenated castor oil), polymeric structuring agents, cellulosic fibers (for example, microfibrillated cellulose, which may be derived from a bacterial, fungal, or plant origin, including from wood), di-amido gellants, or combinations thereof.

Polymeric structuring agents may be naturally derived or synthetic in origin. Naturally derived polymeric structurants may comprise hydroxyethyl cellulose, hydrophobically modified hydroxyethyl cellulose, carboxymethyl cellulose, polysaccharide derivatives and mixtures thereof. Polysaccharide derivatives may comprise pectine, alginate, arabinogalactan (gum Arabic), carrageenan, gellan gum, xanthan gum, guar gum and mixtures thereof. Synthetic polymeric structurants may comprise polycarboxylates, polyacrylates, hydrophobically modified ethoxylated urethanes, hydrophobically modified non-ionic polyols and mixtures thereof. Polycarboxylate polymers may comprise a polyacrylate, polymethacrylate or mixtures thereof. Polyacrylates may comprise a copolymer of unsaturated mono- or di-carbonic acid and $C_1$-$C_{30}$ alkyl ester of the (meth)acrylic acid. Such copolymers are available from Noveon inc under the tradename Carbopol Aqua 30. Another suitable structurant is sold under the tradename Rheovis CDE, available from BASF.

E. Other Adjuncts

The fabric care compositions of the present disclosure may contain other adjuncts that are suitable for inclusion in the product and/or for final usage. For example, the fabric care compositions may comprise neat perfume, perfume delivery technologies (such as pro-perfumes and/or encapsulates having non-polyisocyanate/chitosan wall materials), cationic surfactants, cationic polymers, solvents, suds supressors, or combinations thereof.

Method of Making a Fabric Care Composition

The present disclosure relates to processes for making any of the fabric care compositions described herein. The process of making a fabric care composition, which may be a consumer product composition, may comprise the step of combining a quaternary ammonium ester material with a population of delivery particles, as described herein.

The delivery particles may be combined with the quaternary ammonium ester material when the delivery particles are in one or more forms, including a slurry form, neat particle form, and/or spray dried particle form, preferably slurry form. The delivery particles may be combined with such ester quats by methods that include mixing and/or spraying.

The fabric care compositions of the present disclosure can be formulated into any suitable form and prepared by any process chosen by the formulator. The ester quat material and the delivery particles may be combined in a batch process, in a circulation loop process, and/or by an in-line mixing process. Suitable equipment for use in the processes disclosed herein may include continuous stirred tank reactors, homogenizers, turbine agitators, recirculating pumps, paddle mixers, high shear mixers, static mixers, plough shear mixers, ribbon blenders, vertical axis granulators and drum mixers, both in batch and, where available, in continuous process configurations, spray dryers, and extruders.

The fabric care composition may be placed into a bottle, preferably a plastic bottle. The fabric care composition may be placed into an aerosol or other spray container according to known methods.

Method of Using a Fabric Care Composition

The present disclosure further relates to methods of using a fabric care composition. For example, the present disclosure relates to methods of treating a fabric with a composition according to the present disclosure. Such methods may provide conditioning and/or freshening benefits.

The method may include a step of contacting a fabric with a fabric care composition of the present disclosure. The composition may be in neat form or diluted in a liquor, for example, a wash or rinse liquor. The composition may be diluted in water prior, during, or after contacting the surface or article. The fabric may be optionally washed and/or rinsed before and/or after the contacting step. The composition may be applied directly onto a fabric or provided to a dispensing vessel or drum of an automatic laundry machine.

The method of treating a fabric may include the steps of: (a) optionally washing, rinsing and/or drying the fabric; (b) contacting the fabric with a composition as described herein, optionally in the presence of water; (c) optionally washing and/or rinsing the fabric; and (d) optionally drying, whether passively and/or via an active method such as a laundry dryer. The method may occur during the wash cycle or the rinse cycle, preferably the rinse cycle, of an automatic washing machine.

For purposes of the present disclosure, treatment may include but is not limited to, scrubbing and/or mechanical agitation. The fabric may comprise most any fabric capable of being laundered or treated in normal consumer use conditions.

Liquors that comprise the disclosed compositions may have a pH of from about 3 to about 11.5. When diluted, such compositions are typically employed at concentrations of from about 500 ppm to about 15,000 ppm in solution. When the wash solvent is water, the water temperature typically ranges from about 5° C. to about 90° C. and, the water to fabric ratio may be typically from about 1:1 to about 30:1.

Combinations

Specifically contemplated combinations of the disclosure are herein described in the following numbered and/or lettered paragraphs. These combinations are intended to be illustrative in nature and are not intended to be limiting.

1. A fabric care composition comprising:

quaternary ammonium ester material, wherein the quaternary ammonium ester material comprises triester quaternary ammonium material ("triester quats"), wherein the triester quaternary ammonium material is derived, in part, from C13-C22 fatty acids; and a population of delivery particles, wherein the delivery particles comprise a core and shell surrounding the core, wherein the core comprises a benefit agent, wherein the shell comprises a polymeric material that is the reaction product of a polyisocyanate and chitosan.

2. The fabric care composition according to numbered paragraph 1, wherein the quaternary ammonium ester material comprises compounds according to Formula (I):

$$\{R^2_{(4-m)}—N+—[X—Y—R^1]_m\}A^- \quad \text{Formula (I)}$$

wherein:

m is 1, 2 or 3, with provisos that in a given molecule, the value of each m is identical, and for at least some of the compounds according to Formula (I), m is 3;

each $R^1$, which optionally comprises from 13 to 22 carbon atoms, is independently a linear hydrocarbyl or branched hydrocarbyl group, preferably $R^1$ is linear, more preferably $R^1$ is partially unsaturated linear alkyl chain;

each $R^2$ is independently a $C_1$-$C_3$ alkyl or hydroxyalkyl group and/or each $R^2$ is selected from methyl, ethyl, propyl, hydroxyethyl, 2-hydroxypropyl, 1-methyl-2-hydroxyethyl, poly($C_2$-$C_3$ alkoxy), polyethoxy, benzyl, more preferably methyl or hydroxyethyl;

each X is independently —$(CH_2)_n$—, —$CH_2$—CH($CH_3$)— or —CH($CH_3$)—$CH_2$—, where each n is independently 1, 2, 3 or 4, preferably each n is 2;

each Y is independently —O—(O)C— or —C(O)—O—; and

A− is independently selected from the group consisting of chloride, bromide, methyl sulfate, ethyl sulfate, sulfate, and nitrate, preferably A− is selected from the group consisting of chloride and methyl sulfate, more preferably A− is methyl sulfate.

3. The fabric care composition according to any preceding numbered paragraph, wherein the composition comprises from about 1% to about 35%, by weight of the composition, of the quaternary ammonium ester material, preferably at a level of from about 2% to about 25%, more preferably from about 4% to about 20%, more preferably from about 5% to about 15%, more preferably from about 6% to about 12%, by weight to of the fabric care composition.

4. The fabric care composition according to any preceding numbered paragraph, wherein the quaternary ammonium ester material is derived from fatty acids characterized by an iodine value of from 0 to 140, or from 0 to about 90, or from about 10 to about 70, or from about 15 to about 50, or from about 18 to about 30.

5. The fabric care composition according to any preceding numbered paragraph, wherein the fatty acids are derived from plants, preferably wherein the fatty acids are derived from canola oil, safflower oil, peanut oil, sunflower oil, sesame seed oil, rapeseed oil, cottonseed oil, corn oil, soybean oil, tall oil, rice bran oil, palm oil, palm kernel oil, coconut oil, other tropical palm oils, linseed oil, tung oil, or mixtures thereof, more preferably canola oil, rapeseed oil, cottonseed oil, palm oil, palm kernel oil, coconut oil, or mixtures thereof.

6. The fabric care composition according to any preceding numbered paragraph, wherein the ammonium quaternary ester material comprises material derived from unsaturated fatty acids and optionally from triethanolamine, preferably unsaturated fatty acids that include eighteen carbons ("C18"), more preferably C18 fatty acids that include a single double bond ("C18:1 fatty acids"), even more preferably wherein such material is present at a level of from about 10% to about 40%, or from about 10% to about 30%, or from about 15% to about 30%, by weight of the ammonium quaternary ester material.

7. The fabric care composition according to any preceding numbered paragraph, wherein the quaternary ammonium ester material comprises from about 40.0% to about 60.0%, by weight of the quaternary ammonium ester material, of a diester quaternary ammonium material ("diester quat"), and from about 15% to about 38.0%, by weight of the quaternary ammonium ester material, of triester quat, preferably wherein the quaternary ammonium ester material further comprises monoester quaternary ammonium material ("monoester quat"), preferably wherein the level of monoester quat is from 15.0% to 35.0%, by weight of the quaternary ammonium ester material.

8. The fabric care composition according to any preceding numbered paragraph, wherein the quaternary ammonium ester material is derived, at least in part, from trialkanolamines, preferably triethanolamines.

9. The consumer product composition according to any preceding numbered paragraph, wherein the benefit agent comprises perfume raw materials, preferably wherein the perfume raw materials comprise at least about 20%, preferably at least about 25%, more preferably at least about 30%, more preferably at least about 40%, even more preferably at least about 50%, by weight of the fragrance by weight of the perfume raw materials, of aldehyde-containing perfume raw materials, ketone-containing raw materials, or mixtures thereof.

10. The fabric care composition according to any preceding numbered paragraph, wherein the core of the perfume encapsulates further comprise a partitioning modifier, preferably a partitioning modifier selected from the group consisting of vegetable oil, modified vegetable oil, mono-, di-, and tri-esters of $C_4$-$C_{24}$ fatty acids, isopropyl myristate, dodecanophenone, lauryl laurate, methyl behenate, methyl laurate, methyl palmitate, methyl stearate, and mixtures thereof, more preferably isopropyl myristate.

11. The fabric care composition according to any preceding numbered paragraph, wherein the chitosan is hydrolyzed chitosan.
12. The fabric care composition according to any preceding numbered paragraph, wherein the chitosan is characterized by one or more of the following:
 a) a degree of deacetylization of at least 50%, preferably at least 75%, more preferably at least 85%, or even at least 92%, and/or
 b) a weight average molecular weight of 95 kDa or less.
13. The fabric care composition according to any preceding numbered paragraph, wherein the shell comprises the chitosan, preferably hydrolyzed chitosan, at a level of at least about 21 wt %, by weight of the shell,
 preferably from about 21 wt % to about 90 wt %, more preferably from about 21 wt % to about 85 wt %, even more preferably from about 21 wt % to about 75 wt %, or even more preferably from about 21 wt % to about 55 wt %.
14. The fabric care composition according to any preceding numbered paragraph, wherein the polyisocyanate is selected from the group consisting of a polyisocyanurate of toluene diisocyanate, a trimethylol propane adduct of toluene diisocyanate and a trimethylol propane adduct of xylylene diisocyanate, methylene diphenyl isocyanate, toluene diisocyanate, tetramethylxylidene diisocyanate, naphthalene-1,5-diisocyanate, phenylene diisocyanate, or mixtures thereof.
15. The fabric care composition according to any preceding numbered paragraph, wherein the delivery particles are formed by a process that comprises the following steps:
 forming a water phase by hydrolyzing chitosan in an aqueous acidic medium at a pH of 6.5 or less and a temperature of at least 60° C. for at least one hour;
 forming an oil phase comprising dissolving together at least one benefit agent and at least one polyisocyanate, optionally with an added oil;
 forming an emulsion by mixing under high shear agitation the water phase and the oil phase into an excess of the water phase, thereby forming droplets of the oil phase and benefit agent dispersed in the water phase, and optionally adjusting the pH of the emulsion to be in a range from pH 2 to pH 6;
 curing the emulsion by heating to at least 40° C., for a time sufficient to form a shell at an interface of the droplets with the water phase, the shell comprising the reaction product of the polyisocyanate and hydrolyzed chitosan, and the shell surrounding the core comprising the droplets of the oil phase and benefit agent.
16. The fabric care composition according to numbered paragraph 14, wherein the weight ratio of hydrolyzed chitosan in the water phase as compared to the polyisocyanate in the oil phase is from about 21:79 to about 90:10, preferably from about 1:2 to about 10:1, more preferably from about 1:1 to about 7:1.
17. The fabric care composition according to any preceding numbered paragraph, wherein the chitosan is formed by hydrolyzing chitosan in an acidic medium at a pH of 6.5 or less, preferably at a pH of from about 3 to about 6, and at a temperature of at least 45 C for at least one hour.
18. The fabric care composition according to any preceding numbered paragraph, wherein the delivery particles are characterized by a volume-weighted median particle size from about 1 to about 100 microns,
 preferably from about 10 to about 100 microns, preferably from about 15 to about 50 microns, more preferably from about 20 to about 40 microns, even more preferably from about 20 to about 30 microns.
19. The fabric care composition according to any preceding numbered paragraph, wherein the delivery particles are characterized by a zeta potential of at least 15 millivolts (mV) at a pH of 4.5, or even at least 40 mV at a pH of 4.5, or even at least 60 mV at a pH of 4.5.
20. The fabric care composition according to any preceding numbered paragraph, wherein the shells of the delivery particles degrade at least 60% in 60 days when tested according to test method OECD 301B.
21. The fabric care composition according to any preceding numbered paragraph, wherein the composition further comprises a treatment adjunct selected from the group consisting of: additional fabric conditioning agents, dyes, pH control agents, solvents, rheology modifiers, structurants, cationic polymers, surfactants, perfume, additional perfume delivery systems, chelants, antioxidants, preservatives, and mixtures thereof.
22. The fabric care composition according to any preceding numbered paragraph, wherein the composition further comprises an additional fabric conditioning active selected from silicones, non-ester quaternary ammonium compounds, amines, fatty esters, sucrose esters, silicones, dispersible polyolefins, polysaccharides, fatty acids, softening or conditioning oils, polymer latexes, glyceride copolymers, or combinations thereof, preferably silicones,
 more preferably where the quaternary ammonium ester material and the silicone are present in a weight ratio of from about 1:10 to about 10:1, or from about 1:5 to about 5:1, or from about 1:3 to about 1:3, or from about 1:2 to about 2:1, or about 1:1.5 to about 1.5:1, or about 1:1.
23. The fabric care composition according to any preceding numbered paragraph, wherein the composition is a rinse-added fabric care composition.
24. The fabric care composition according to any preceding numbered paragraph, wherein the fabric care composition is in the form of a liquid,
 preferably a liquid comprising from about 50% to about 97%, preferably from about 60% to about 96%, more preferably from about 70% to about 95%, or even from about 80% to about 95%, by weight of the fabric care composition, of water.
25. The fabric care composition according to any preceding numbered paragraph, wherein the fabric care composition is characterized by a pH of from about 2 to about 12, or from about 2 to about 8.5, or from about 2 to about 7, or from about 2 to about 5, or from about 2 to about 4, from about 2 to about 3.7, more preferably from about 2 to about 3.5.
26. A method of treating a fabric, wherein the method comprises the step of contacting the fabric with a fabric care composition according to any preceding numbered paragraph,
 optionally in the presence of water.

Test Methods

It is understood that the test methods disclosed in the Test Methods section of the present application should be used to determine the respective values of the parameters of Applicant's claimed subject matter as claimed and described herein.

Method of Measuring Iodine Value of a Quaternary Ammonium Ester Compound

The iodine value of a quaternary ammonium ester fabric compound is the iodine value of the parent fatty acid from which the fabric conditioning active is formed, and is defined as the number of grams of iodine which react with 100 grams of parent fatty acid from which the fabric conditioning active is formed.

First, the quaternary ammonium ester compound is hydrolysed according to the following protocol: 25 g of fabric treatment composition is mixed with 50 mL of water and 0.3 mL of sodium hydroxide (50% activity). This mixture is boiled for at least an hour on a hotplate while avoiding that the mixture dries out. After an hour, the mixture is allowed to cool down and the pH is adjusted to neutral (pH between 6 and 8) with sulfuric acid 25% using pH strips or a calibrated pH electrode.

Next the fatty acid is extracted from the mixture via acidified liquid-liquid extraction with hexane or petroleum ether: the sample mixture is diluted with water/ethanol (1:1) to 160 mL in an extraction cylinder, 5 grams of sodium chloride, 0.3 mL of sulfuric acid (25% activity) and 50 mL of hexane are added. The cylinder is stoppered and shaken for at least 1 minute. Next, the cylinder is left to rest until 2 layers are formed. The top layer containing the fatty acid in hexane is transferred to another recipient. The hexane is then evaporated using a hotplate leaving behind the extracted fatty acid.

Next, the iodine value of the parent fatty acid from which the fabric conditioning active is formed is determined following ISO3961:2013. The method for calculating the iodine value of a parent fatty acid comprises dissolving a prescribed amount (from 0.1-3 g) into 15 mL of chloroform. The dissolved parent fatty acid is then reacted with 25 mL of iodine monochloride in acetic acid solution (0.1M). To this, 20 mL of 10% potassium iodide solution and 150 mL deionised water is added. After the addition of the halogen has taken place, the excess of iodine monochloride is determined by titration with sodium thiosulphate solution (0.1M) in the presence of a blue starch indicator powder. At the same time a blank is determined with the same quantity of reagents and under the same conditions. The difference between the volume of sodium thiosulphate used in the blank and that used in the reaction with the parent fatty acid enables the iodine value to be calculated.

Method of Measuring Fatty Acid Chain Length Distribution

The fatty acid chain length distribution of the quaternary ammonium ester fabric conditioning active refers to the chain length distribution of the parent fatty acid from which the fabric conditioning active is formed. It can be measured on the quaternary ammonium ester conditioning active or on the fatty acid extracted from the fabric softener composition as described in the method to determine the iodine value of a quaternary ammonium ester fabric conditioning active. The fatty acid chain length distribution is measured by dissolving 0.2 g of the quaternary ammonium ester conditioning active or extracted fatty acid in 3 mL of 2-butanol, 3 glass beads are added and the sample is vortexed at high speed for 4 minutes. An aliquot of this extract is then transferred into a 2 mL gas chromatography vial, which is then injected into the gas chromatogram inlet (250° C.) of the gas chromatograph (Agilent GC6890N) and the resultant bi-products are separated on a DB-5 ms column (30 m×250 μm×1.0 μm, 2.0 mL/min). These bi-products are identified using a mass-spectrometer (Agilent MSD5973N, Chemstation Software version E.02.02) and the peak areas of the corresponding fatty acid chain lengths are measured. The fatty acid chain length distribution is determined by the relative ratios of the peak areas corresponding to each fatty acid chain length of interest as compared to the sum of all peaks corresponding to all fatty acid chain lengths.

Viscosity

Viscosity of liquid finished product is measured using an AR 550 rheometer/viscometer from TA instruments (New Castle, DE, USA), using parallel steel plates of 40 mm diameter and a gap size of 500 μm. The high shear viscosity at 20 $s^{-1}$ and low shear viscosity at 0.05 $s^{-1}$ is obtained from a logarithmic shear rate sweep from 0.01 $s^{-1}$ to 25 $s^{-1}$ in 3 minutes time at 21° C.

Perfume, Perfume Raw Materials (PRMs), and/or Partitioning Modifier

A. Identity and Total Quantity

To determine the identity and to quantify the total weight of perfume, perfume ingredients, or Perfume Raw Materials (PRMs), or partitioning modifier in the capsule slurry, and/or encapsulated within the delivery agent encapsulates, Gas Chromatography with Mass Spectroscopy/Flame Ionization Detector (GC-MS/FID) 15 employed. Suitable equipment includes: Agilent Technologies G1530A GC/FID; Hewlett Packer Mass Selective Device 5973; and 5%-Phenyl-methylpolysiloxane Column J&W DB-5 (30 m length×0.25 mm internal diameter×0.25 μm film thickness). Approximately 3 g of the finished product or suspension of delivery encapsulates, is weighed and the weight recorded, then the sample is diluted with 30 mL of DI water and filtered through a 5.0 μm pore size nitrocellulose filter membrane. Material captured on the filter is solubilized in 5 mL of ISTD solution (25.0 mg/L tetradecane in anhydrous alcohol) and heated at 60° C. for 30 minutes. The cooled solution is filtered through 0.45 μm pore size PTFE syringe filter and analyzed via GC-MS/FID. Three known perfume oils are used as comparison reference standards. Data Analysis involves summing the total area counts minus the ISTD area counts and calculating an average Response Factor (RF) for the 3 standard perfumes. Then the Response Factor and total area counts for the product encapsulated perfumes are used along with the weight of the sample, to determine the total weight percent for each PRM in the encapsulated perfume. PRMs are identified from the mass spectrometry peaks.

B. Amount of Non-Encapsulated Material

In order to determine the amount of non-encapsulated perfume and (optionally) partitioning modifier material in a composition such as a slurry, the following equipment can be used for this analysis, using the analysis procedure provided after the table.

| | |
|---|---|
| Gas chromatograph/MS | Agilent GC6890 equipped with Agilent 5973N mass spectrometer or equivalent, capillary column operation, quantiation based on extracted ion capability, autosampler |
| Column for GC-MS | 30 m × 0.25 mm nominal diameter, 0.25 μm film thickness, J&W 122-5532 DB-5, or equivalent. |

To prepare a perfume standard in ISS Hexane, weigh 0.050+/−0.005 g of the desired PMC perfume oil into a 50 mL volumetric flask (or other volumetric size recalculating g of perfume oil to add). Fill to line with ISS Hexane solution from above. The ISS Hexane is a 0.1 g of Tetradecane in 4 liters of hexane.

To prepare a 5% surfactant solution, weigh 50 g+/−1 g of the sodium dodecyl sulphate in a beaker and, using purified water, transfer quantitatively to a 1 liter volumetric flask, and ensure the surfactant is fully dissolved.

To prepare the sample of the PMC composition (e.g., a slurry), confirm the composition (e.g., a slurry) is well-mixed; mix if necessary. Weigh 0.3+/−0.05 g of composition sample onto the bottom of a 10 mL vial. Avoid composition on the wall of the vial.

To operate the instrument, determine a target ion for quantification for each PRM (and optionally partitioning modifier) along with a minimum of one qualifier ion, preferably two. Calibration curves are generated from the Perfume standard for each PRM. Utilizing the sample weight and individual PRM weight %, the integration of the extracted ion (EIC) for each PRM and the amount are plotted or recorded.

The amount of free oil is determined from the response of each PRM versus the calibration curve and summed over all the different perfume materials and optionally the partitioning modifier.

C. Determination of Encapsulated Material

The determination of the encapsulated oil and optionally the partitioning modifier is done by the subtraction of the weight of free/non-encapsulated oil found in the composition from the amount by weight of total oil found in the composition (e.g. a slurry).

Test Method for Determining Log P

The value of the log of the Octanol/Water Partition Coefficient (log P) is computed for each material (e.g., each PRM in the perfume mixture) being tested. The log P of an individual material (e.g., a PRM) is calculated using the Consensus log P Computational Model, version 14.02 (Linux) available from Advanced Chemistry Development Inc. (ACD/Labs) (Toronto, Canada) to provide the unitless log P value. The ACD/Labs' Consensus log P Computational Model is part of the ACD/Labs model suite.

Volume-Weighted Particle Size and Size Distribution

The volume-weighted particle size distribution is determined via single-particle optical sensing (SPOS), also called optical particle counting (OPC), using the AccuSizer 780 AD instrument and the accompanying software CW788 version 1.82 (Particle Sizing Systems, Santa Barbara, California, U.S.A.), or equivalent. The instrument is configured with the following conditions and selections: Flow Rate=1 ml/sec; Lower Size Threshold=0.50 μm; Sensor Model Number=Sensor Model Number=LE400-05 or equivalent; Autodilution=On; Collection time=60 sec; Number channels=512; Vessel fluid volume=50 ml; Max coincidence=9200. The measurement is initiated by putting the sensor into a cold state by flushing with water until background counts are less than 100. A sample of delivery capsules in suspension is introduced, and its density of capsules adjusted with DI water as necessary via autodilution to result in capsule counts of at least 9200 per ml. During a time period of 60 seconds the suspension is analyzed. The resulting volume-weighted PSD data are plotted and recorded, and the values of the desired volume-weighted particle size (e.g., the median/50$^{th}$ percentile, 5$^{th}$ percentile, and/or 90$^{th}$ percentile) are determined.

The broadness index can be calculated by determining the delivery particle size at which 90% of the cumulative particle volume is exceeded (90% size), the particle size at which 5% of the cumulative particle volume is exceeded (5% size), and the median volume-weighted particle size (50% size: 50% of the particle volume both above and below this size).

Broadness Index=((90% size)−(5% size))/50% size.

Procedure for Determination of % Degradation

To determine % degradation, the procedure set forth in the "OECD Guideline for Testing of Chemicals" 301B $CO_2$ Evolution (Modified Sturm Test), adopted 17 Jul. 1992, is used. For ease of reference, this test method is referred to herein as test method OECD 301B.

Procedure for Determination of Free Oil

This method measures the amount of oil in the water phase and uses as an internal standard solution 1 mg/ml dibutyl phthalate (DBP)/hexane.

Weigh a little more than 250 mgs of DBP into a small beaker and transfer to a 250 ml volumetric rinsing the beaker thoroughly. Fill with hexane to 250 ml.

Sample Prep: Weigh approximately 1.5-2 grams (40 drops) of the capsule slurry into a 20 ml scintillation vial and add 10 ml's of the ISTD solution, cap tightly. Shaking vigorously several times over 30 minutes, pipette solution into an autosampler vial and analyze by GC.

Additional details. Instrumentation: HP5890 GC connected to HP Chem Station Software; Column: 5 m×0.32 mm id with 1 μm DB-1 liquid phase; Temperature 50 deg for 1 minute then heat to 320 deg @ 15 deg/min; Injector: 275° C.; Detector: 325° C.; 2 ul injection.

Calculation: Add total peak area minus the area for the DBP for both the sample and calibration.

Calculate Mg of Free Core Oil:

$$\frac{\text{Total area from sample}}{\text{Total area from calibration}} \times \text{mg of oil in calibration solution} = \text{mg of free oil}$$

Calculate % Free Core Oil:

$$\frac{\text{mg of free core oil}}{\text{Sample wt. (mg)}} \times 100 = \text{\% free core oil in wet slurry}$$

Procedure for Determination of Benefit Agent Leakage

Obtain two, 1-gram samples of benefit agent particle composition. Add 1 gram (Sample 1) of particle composition to 99 grams of product matrix in which the particle will be employed. Age the particle containing product matrix (Sample 1) for 2 weeks at 35° C. in a sealed glass jar. The other 1 gram sample (Sample 2) is similarly aged.

After 2 weeks, use filtration to recover the particle composition's particles from the product matrix (Sample 1) and from the particle composition (Sample 2). Treat each particle sample with a solvent that will extract all the benefit agent from each samples' particles. Inject the benefit agent containing solvent from each sample into a Gas Chromatograph and integrate the peak areas to determine the total quantity of benefit agent extracted from each sample.

Determine the percentage of benefit agent leakage by calculating the difference in the values obtained for the total quantity of benefit agent extracted from Sample 2 minus Sample 1, expressed as a percentage of the total quantity of benefit agent extracted from Sample 2, as represented in the equation below:

$$\text{Percentage of Benefit Agent Leakage} = \left(\frac{\text{Sample 2} - \text{Sample 1}}{\text{Sample 2}}\right) \times 100$$

Method for Treating Fabrics with Fabric Softener Composition Prior to Perfume Intensity Evaluation The method to treat fabrics with fabric softener composition comprises a fabric pretreatment phase followed by a fabric treatment phase.

Fabric Pretreatment Phase:

2.9±0.1 kg of ballast fabrics containing cotton, polyester, polycotton, 3 white knitted cotton fabric tracers (from Warwick Equest) and 3 white polyester tracers are washed 4 times with 50 g Non-perfumed Ariel Sensitive (Nordics) at 60° C. with 2 grains per gallon (gpg) water, 1 h 26 min cycle, 1600 rpm, in a front loader washing machine such as Miele (Novotronic W986/Softronic W467/W526/W527/W1614/W1714/W2261) or equivalent and then washed once with no detergent at 60° C. with 2 gpg water. After the last wash, fabrics are dried in a 5 kg drum tumble drier with hot air outlet such as Miele Novotronic (T490/T220/T454/T430/T410/T7634) or equivalent and then they are ready to be used for testing.

Fabric Treatment Phase:

2.9±0.1 kg of ballast fabrics containing cotton, polyester, polycotton, 3 white knitted cotton fabric tracers (from Warwick Equest) and 3 white polyester tracers are washed in 15 gpg water at 40° C., 1 h 54 minutes cycle, 1200 rpm without laundry detergent to avoid interference in the fabric softener evaluation. Liquid fabric softener composition is pre-diluted in 2 L of 15° C. water with a hardness of 15 gpg five min before the starting of the last rinse and added to the last rinse while the washing machine is taking the water. This is a requirement to ensure homogeneous dispensability over the load and minimize the variability of the test results. All fabrics are line dried in a control temperature (25° C.) and humidity (60%) room for 24 hours prior to head space concentration determination.

Perfume Intensity Evaluation

Perfume intensity evaluation is conducted by a trained panel. The panel grades on a perfume odor intensity scale from 0 to 100, where 0=no perfume odor, 25=slight perfume odor, 50=moderate perfume odor, 75=strong perfume odor, and 100=extremely strong perfume odor. Fabrics are evaluated for perfume intensity at the wet, dry, and/or rub touchpoints.

EXAMPLES

The examples provided below are intended to be illustrative in nature and are not intended to be limiting.

SYNTHESIS EXAMPLES

In the following examples, the abbreviations correspond to the materials listed in Table 1.

TABLE 1

| Trade Name | Company/City | Material |
|---|---|---|
| Selvol 540 | Sekisui Specialty Chemicals, Dallas, TX | Polyvinyl alcohol |
| ChitoClear | Primex EHF, Siglufjordur, Iceland | Chitosan |
| Takenate D-110N | Mitsui Chemicals America, Inc., Rye Brook, NY | Aliphatic polyisocyanate prepolymer |
| Mondur MR | Covestro LLC, Pittsburgh, PA | Polymeric diphenyl methane diisocyanate |
| SAS-305 | JX Nippon Chemical Texas Inc., Pasadena, TX | Isopropyl diphenylethane |

Synthesis Example 1

A water phase is prepared by dispersing 12.40 g ChitoClear into 350.00 g water while mixing in a jacketed reactor. The pH of the water phase is then adjusted to 4.7 using concentrated HCl under agitation. The water phase temperature is then increased to 85° C. over 60 minutes and then held at 85° C. for a period of time to hydrolyze the ChitoClear. The water phase temperature is then reduced to 25° C. after the hydrolyzing step over a period of 90 minutes. An oil phase is prepared by mixing 87.50 g perfume oil and 22.50 g isopropyl myristate together along with 15.00 g Takenate D-110N at room temperature. The oil phase is added to the water phase under high shear milling to obtain an emulsion. The emulsion is heated to 40° C. over 30 minutes and held for 60 minutes. The emulsion is then heated to 85° C. and maintained at this temperature for 6 hours while mixing.

Synthesis Example 2

A water phase is prepared by dispersing 26.45 g ChitoClear into 450.00 g water while mixing in a jacketed reactor. The pH of the water phase is then adjusted to 6.0 using concentrated HCl under agitation. The water phase temperature is then increased to 85° C. over 60 minutes and then held at 85° C. for a period of time to hydrolyze the ChitoClear. The water phase temperature is then reduced to 25° C. after the hydrolyzing step over a period of 90 minutes. An oil phase is prepared by mixing 159.38 g perfume oil and 23.91 g isopropyl myristate together along with 4.00 g Takenate D-110N at room temperature. The oil phase is added to the water phase under high shear milling to obtain an emulsion. The emulsion is heated to 40° C. over 30 minutes and held for 60 minutes. The emulsion is then heated to 85° C. and maintained at this temperature for 6 hours while mixing.

Synthesis Example 3

A water phase is prepared by dispersing 5.70 g ChitoClear into 350.00 g water while mixing in a jacketed reactor. The pH of the water phase is then adjusted to 4.7 using concentrated HCl under agitation. The water phase temperature is then increased to 85° C. over 60 minutes and then held at 85° C. for a period of time to hydrolyze the ChitoClear. The water phase temperature is then reduced to 25° C. after the hydrolyzing step over a period of 90 minutes. An oil phase is prepared by mixing 120.00 g perfume oil and 30.00 g isopropyl myristate together along with 3.78 g Mondur MR at room temperature. The oil phase is added to the water phase under high shear milling to obtain an emulsion. The emulsion is heated to 40° C. over 30 minutes and held for 60 minutes. The emulsion is then heated to 85° C. and maintained at this temperature for 6 hours while mixing.

Synthesis Example 4

A water phase is prepared by dispersing 5.70 g ChitoClear into 350.00 g water while mixing in a jacketed reactor. The pH of the water phase is then adjusted to 4.0 using concentrated HCl under agitation. The water phase temperature is then increased to 85° C. over 60 minutes and then held at 85° C. for a period of time to hydrolyze the ChitoClear. The water phase temperature is then reduced to 25° C. after the hydrolyzing step over a period of 90 minutes. An oil phase is prepared by mixing 150.00 g SAS-305 with 3.78 g Mondur MR at room temperature. The oil phase is added to the water phase under high shear milling to obtain an emulsion. The emulsion is heated to 40° C. over 30 minutes and held for 60 minutes. The emulsion is then heated to 85° C. and maintained at this temperature for 6 hours while mixing.

PERFORMANCE EXAMPLE

To test the performance benefits of compositions according to the present disclosure, various liquid fabric conditioning compositions are prepared. The compositions include different combinations of delivery particle shell chemistries, perfumes encapsulated therein, and ester quat material. Fabrics are treated with the compositions and then evaluated for perfume intensity at a various touchpoints according to the methods described in the Test Method section.

The materials, compositions, and results at the wet touchpoint are provided below

TABLE 1

| Materials | |
|---|---|
| **Ester Quat** | |
| A* | Diester quat[1] derived from a diethanolamine (with chloride counterion) |
| B* | Diester quat[2] derived from a di-isopropanolamine (with methyl sulfate counterion) |
| C | Triester quat[3] derived from a triethanolamine (with methyl sulfate counterion) |
| **Perfume Delivery Particle[4]** | |
| D | Particle having a polyisocyanate/chitosan shell according to the present disclosure[5] |
| E* | Comparative particle having a polyacrylate shell[6] |

*= Comparative material

[1]N,N-bis(hydroxyethyl)-N,N-dimethyl ammonium chloride fatty acid ester, produced from C12-C18 fatty acid mixture (REWOQUAT CI-DEEDMAC, ex Evonik)

[2]Mixture of bis-(2-hydroxypropyl)-dimethylammonium methylsulfate fatty acid ester, (2-hydroxypropyl)-(1-methyl-2-hydroxyethyl)-dimethylammonium methylsulfate fatty acid ester, and bis-(1-methyl-2-hydroxyethyl)-dimethylammonium methylsulfate fatty acid ester, where the fatty acid esters are produced from a C12-C18 fatty acid mixture (REWOQUAT DIP V 20 M Conc, ex Evonik)

[3]Esterification product of fatty acids (C16-18 and C18 unsaturated) with triethanolamine, quaternized with dimethyl sulphate (REWOQUAT WE 18, ex Evonik)

[4]The perfume delivery particles are formulated with one of five different perfume accords, labeled as perfumes 1-5 in the table below.

[5]For example, particles made according to Synthesis Example 2, above.

[6]For example, polyacrylate particles as disclosed in U.S. Pat. Ser. No. 63/092,528

From the materials above, various liquid fabric care compositions in the form of liquid fabric conditioning/enhancer compositions are made. The compositions include the relevant esterquat present at 5 wt %, the relevant delivery particles added at a level sufficient to provide 0.27 wt % encapsulated fragrance, 0.10 wt % cationic polymer (Flosoft FS222, ex SNF), and various processing minors, with pH adjusted to be approximately 3.

After treatment, the fabrics are assessed for intensity. Results are provided in Table 3.

TABLE 3

| Results at Wet Touchpoint | | | | | | | | |
|---|---|---|---|---|---|---|---|---|
| Ester | | Delivery | Perfume Accords (Intensity Scores) | | | | | Avg |
| Quat | Touchpt | Particle | 1 | 2 | 3 | 4 | 5 | Delta |
| A* | Wet | D | 67.0$^{T}$ | 62.6$^{T}$ | 66.2 | 63.4$^{T}$ | 62.5 | 3.9 |
| | | E* | 58.8 | 64.5 | 56.8 | 60.9 | 61.2 | |
| | | DELTA | 8.2 | −1.9 | 9.4 | 2.5 | 1.3 | |

TABLE 3-continued

| Results at Wet Touchpoint | | | | | | | | |
|---|---|---|---|---|---|---|---|---|
| Ester | | Delivery | Perfume Accords (Intensity Scores) | | | | | Avg |
| Quat | Touchpt | Particle | 1 | 2 | 3 | 4 | 5 | Delta |
| B* | Wet | D | 66.7 | 65.1$^{T}$ | 61.7 | 60.9 | 63.7 | 2.0 |
| | | E* | 55.8 | 62.0 | 64.3 | 62.2 | 63.6 | |
| | | DELTA | 10.9 | 3.1 | −2.6 | −1.3 | 0.1 | |
| C | Wet | D | 69.2 | 70.8 | 73.3 | 70.4 | 63.9 | 7.1 |
| | | E* | 59.8 | 62.8 | 62.2 | 68.2 | 59.3 | |
| | | DELTA | 9.4 | 8.0 | 11.1 | 2.2 | 4.6 | |

$^{T}$= average of two trials

*= comparative material

As can be seen from the results in Table 3, when formulated into fabric care compositions that include triester quats (e.g., Ester Quat C), perfume delivery particles according to the present disclosure (Delivery Particle D) generally perform better than a comparative delivery particle (Delivery Particle E), measured by perfume intensity. Delivery Particle E has been used as a reference particle in order to compare the performance of Delivery Particle D across different test legs; the differences in intensity (shown as DELTA) can be used to show relative improvement.

Furthermore, the trend of greater perfume intensity for delivery particles according to the present disclosure at the wet touchpoint is consistent across the five tested perfumes when placed into the triester quat system (C); in comparative diester quat systems (Ester Quats A and B), the comparative particles show relatively greater intensity with regard to certain perfumes.

Additionally, the relative improvement in perfume intensity, shown as the average DELTA between the scores of the two particles, is greater in the triester quat system (e.g., according to the present disclosure) compared to comparative diester quat systems (Ester Quats A and B). This indicates that triester quat material and the delivery particles according to the present disclosure interact in a synergistic way to provide improved performance (measured as perfume intensity) at the wet fabric touchpoint.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A fabric care composition comprising:

quaternary ammonium ester material, wherein the quaternary ammonium ester material comprises triester quaternary ammonium material ("triester quats"), wherein the triester quaternary ammonium material is derived, in part, from C13-C22 fatty acids; and a population of delivery particles, wherein the delivery particles comprise a core and shell surrounding the core, wherein the core comprises a benefit agent, wherein the shell comprises a polymeric material that is the reaction product of a polyisocyanate and hydrolyzed chitosan, wherein the shell comprises the hydrolyzed chitosan at a level of at least 21 wt %, by weight of the shell; and wherein the hydrolyzed chitosan is characterized by one or more of the following:

a) a degree of deacetylization of at least 85%, and b) a weight average molecular weight of 95 kDa or less.

2. The fabric care composition according to claim 1, wherein the quaternary ammonium ester material comprises compounds according to Formula (I):

$$\{R^2_{(4-m)}—N+—[X—Y—R^1]_m\}A^- \quad \text{Formula (I)}$$

wherein:

m is 1, 2 or 3, with provisos that in a given molecule, the value of each m is identical, and for at least some of the compounds according to Formula (I), m is 3;

each $R^1$, which optionally comprises from 13 to 22 carbon atoms, is independently a linear hydrocarbyl or branched hydrocarbyl group;

each $R^2$ is selected from methyl or hydroxyethyl;

each X is independently —$(CH_2)_n$—, —$CH_2$—CH($CH_3$)— or —CH($CH_3$)—$CH_2$—, where each n is independently 1, 2, 3 or 4;

each Y is independently —O—(O)C— or —C(O)—O—; and

A− is independently selected from the group consisting of chloride, bromide, methyl sulfate, ethyl sulfate, sulfate, and nitrate.

3. The fabric care composition according to claim 1, wherein the composition comprises from about 1% to about 35%, by weight of the composition, of the quaternary ammonium ester material.

4. The fabric care composition according to claim 1, wherein the fatty acids are derived from plants.

5. The fabric care composition according to claim 1, wherein the quaternary ammonium ester material comprises from about 40.0% to about 60.0%, by weight of the quaternary ammonium ester material, of a diester quaternary ammonium material ("diester quat"), and from about 15% to about 38.0%, by weight of the quaternary ammonium ester material, of triester quat.

6. The consumer product composition according to claim 1, wherein the benefit agent comprises perfume raw materials.

7. The fabric care composition according to claim 1, wherein the core of the delivery particles further comprise a partitioning modifier selected from the group consisting of vegetable oil, modified vegetable oil, mono-, di-, and triesters of $C_4$-$C_{24}$ fatty acids, isopropyl myristate, dodecanophenone, lauryl laurate, methyl behenate, methyl laurate, methyl palmitate, methyl stearate, and mixtures thereof.

8. The fabric care composition according to claim 1, wherein the hydrolyzed chitosan is characterized by a degree of deacetylization of at least 92%.

9. The fabric care composition according to claim 1, wherein the shell comprises hydrolyzed chitosan at a level of at least 30 wt %, by weight of the shell.

10. The fabric care composition according to claim 1, wherein the polyisocyanate is selected from the group consisting of a polyisocyanurate of toluene diisocyanate, a trimethylol propane adduct of toluene diisocyanate, a trimethylol propane adduct of xylylene diisocyanate, methylene diphenyl isocyanate, toluene diisocyanate, tetramethylxylidene diisocyanate, naphthalene-1,5-diisocyanate, phenylene diisocyanate, or mixtures thereof.

11. The fabric care composition according to claim 1, wherein the delivery particles are formed by a process that comprises the following steps:

forming a water phase by hydrolyzing chitosan in an aqueous acidic medium at a pH of 6.5 or less and a temperature of at least 60° C. for at least one hour;

forming an oil phase comprising dissolving together at least one benefit agent and at least one polyisocyanate, with an added oil;

forming an emulsion by mixing under high shear agitation the water phase and the oil phase into an excess of the water phase, thereby forming droplets of the oil phase and benefit agent dispersed in the water phase, and adjusting the pH of the emulsion to be in a range from pH 2 to pH 6;

curing the emulsion by heating to at least 40° C., for a time sufficient to form the shell at an interface of the droplets with the water phase, the shell comprising the reaction product of the polyisocyanate and hydrolyzed chitosan, and the shell surrounding the core comprising the droplets of the oil phase and benefit agent.

12. The fabric care composition according to claim 11, wherein the weight ratio of hydrolyzed chitosan in the water phase as compared to the polyisocyanate in the oil phase is from about 21:79 to about 90:10.

13. The fabric care composition according to claim 1, wherein the chitosan is formed by hydrolyzing chitosan in an acidic medium at a pH of 6.5 or less, and at a temperature of at least 45 C for at least one hour.

14. The fabric care composition according to claim 1, wherein the delivery particles are characterized by a volume-weighted median particle size from about 1 to about 100 microns.

15. The fabric care composition according to claim 1, wherein the shells of the delivery particles degrade at least 60% in 60 days when tested according to test method OECD 301B.

16. The fabric care composition according to claim 1, wherein the composition further comprises a treatment adjunct selected from the group consisting of: additional fabric conditioning agents, dyes, pH control agents, solvents, rheology modifiers, structurants, cationic polymers, surfactants, perfume, additional perfume delivery systems, chelants, antioxidants, preservatives, and mixtures thereof.

17. The fabric care composition according to claim 1, wherein the fabric care composition is in the form of a liquid.

18. The fabric care composition according to claim 1, wherein the fabric care composition is characterized by a pH of from about 2 to about 5.

* * * * *